(12) United States Patent
Masugi

(10) Patent No.: US 11,789,246 B2
(45) Date of Patent: *Oct. 17, 2023

(54) ZOOM LENS, OPTICAL APPARATUS AND METHOD FOR MANUFACTURING THE ZOOM LENS

(71) Applicant: Nikon Corporation, Tokyo (JP)

(72) Inventor: Saburo Masugi, Kawasaki (JP)

(73) Assignee: Nikon Corporation, Tokyo (JP)

(*) Notice: Subject to any disclaimer, the term of this patent is extended or adjusted under 35 U.S.C. 154(b) by 109 days.

This patent is subject to a terminal disclaimer.

(21) Appl. No.: 17/232,184

(22) Filed: Apr. 16, 2021

(65) Prior Publication Data

US 2021/0255423 A1 Aug. 19, 2021

Related U.S. Application Data

(62) Division of application No. 15/761,872, filed as application No. PCT/JP2016/078972 on Sep. 30, 2016, now Pat. No. 11,042,006.

(30) Foreign Application Priority Data

Sep. 30, 2015 (JP) .................................. 2015-195293

(51) Int. Cl.
  *G02B 15/14* (2006.01)
  *G02B 7/04* (2021.01)
  (Continued)

(52) U.S. Cl.
  CPC ........ *G02B 15/144511* (2019.08); *G02B 7/04* (2013.01); *G02B 9/34* (2013.01);
  (Continued)

(58) Field of Classification Search
  CPC .... G02B 15/144511; G02B 7/04; G02B 9/34; G02B 13/02; G02B 13/06;
  (Continued)

(56) References Cited

U.S. PATENT DOCUMENTS 6,038,084 A    3/2000  Okada et al.
11,042,006 B2*  6/2021  Masugi .......... G02B 15/145511
(Continued)

FOREIGN PATENT DOCUMENTS

CN    103454758 A         12/2013
JP    H06148523 A  *  5/1994  ..... G02B 15/144105
(Continued)

OTHER PUBLICATIONS

English Translation of International Search Report from International Patent Application No. PCT/JP2016/078972, dated Dec. 20, 2016.

(Continued)

*Primary Examiner* — George G. King

(74) *Attorney, Agent, or Firm* — Potomac Law Group, PLLC

(57) ABSTRACT

A zoom lens (ZL) comprises, in order from an object: a first lens group (G1) having negative refractive power; an aperture stop (S); a second lens group (G2) having positive refractive power; a third lens group (G3) having negative refractive power; and a fourth lens group (G4) having positive refractive power. In this zoom lens (ZL), upon zooming from a wide angle end state to a telephoto end state, a distance between the aperture stop (S) and the first lens group (G1), a distance between the aperture stop (S) and the second lens group (G2), and a distance between the aperture stop (S) and the third lens group (G3) are changed and the aperture stop (S) is moved in an optical axis direction.

15 Claims, 18 Drawing Sheets

(51) Int. Cl.
*G02B 9/34* (2006.01)
*G02B 13/02* (2006.01)
*G02B 13/06* (2006.01)
*G02B 27/00* (2006.01)

(52) U.S. Cl.
CPC .............. *G02B 13/02* (2013.01); *G02B 13/06* (2013.01); *G02B 15/145511* (2019.08); *G02B 27/0037* (2013.01)

(58) Field of Classification Search
CPC ........ G02B 15/145511; G02B 27/0037; G02B 13/04; G02B 15/177; G02B 13/18
See application file for complete search history.

(56) References Cited

U.S. PATENT DOCUMENTS

| | | | |
|---|---|---|---|
| 2005/0041302 A1 | 2/2005 | Ozaki et al. | |
| 2007/0201143 A1* | 8/2007 | Kohno | G02B 15/144511 359/680 |
| 2007/0297068 A1* | 12/2007 | Ohashi | G02B 15/145113 359/689 |
| 2013/0027585 A1* | 1/2013 | Souma | G03B 5/00 348/240.1 |
| 2013/0321682 A1 | 12/2013 | Yamasaki | |
| 2014/0022416 A1 | 1/2014 | Shinohara | |
| 2014/0029110 A1* | 1/2014 | Kuwashiro | G02B 15/144511 359/686 |
| 2014/0055659 A1* | 2/2014 | Iwamoto | G02B 15/177 359/686 |
| 2014/0313592 A1 | 10/2014 | Ito | |
| 2015/0219882 A1* | 8/2015 | Mogi | G02B 15/145121 359/686 |
| 2016/0223800 A1 | 8/2016 | Ikegaya | |
| 2019/0064492 A1* | 2/2019 | Koida | G02B 13/02 |

FOREIGN PATENT DOCUMENTS

| | | |
|---|---|---|
| JP | 10-082954 A | 3/1998 |
| JP | 10-082955 A | 3/1998 |
| JP | 11-119101 A | 4/1999 |
| JP | 2000-221403 A | 8/2000 |
| JP | 2005-062770 A | 3/2005 |
| JP | 2014-215500 A | 11/2014 |
| JP | 2016-142979 A | 8/2016 |
| JP | 2016-161889 A | 9/2016 |
| JP | 2018-022573 A | 2/2018 |

OTHER PUBLICATIONS

English Translation of International Preliminary Report on Patentability from International Patent PCT/JP2016/078972, dated Apr. 12, 2018.
Office Action dated Mar. 19, 2019, in Japanese Patent Application No. 2017-543605.
Office Action dated Nov. 4, 2019, in Chinese Patent Application No. 201680057655.X.
Office Action dated Aug. 28, 2020, in Chinese Patent Application No. 201680057655.X.
Office Action dated Mar. 1, 2021, in Chinese Patent Application No. 201680057655.X.

* cited by examiner

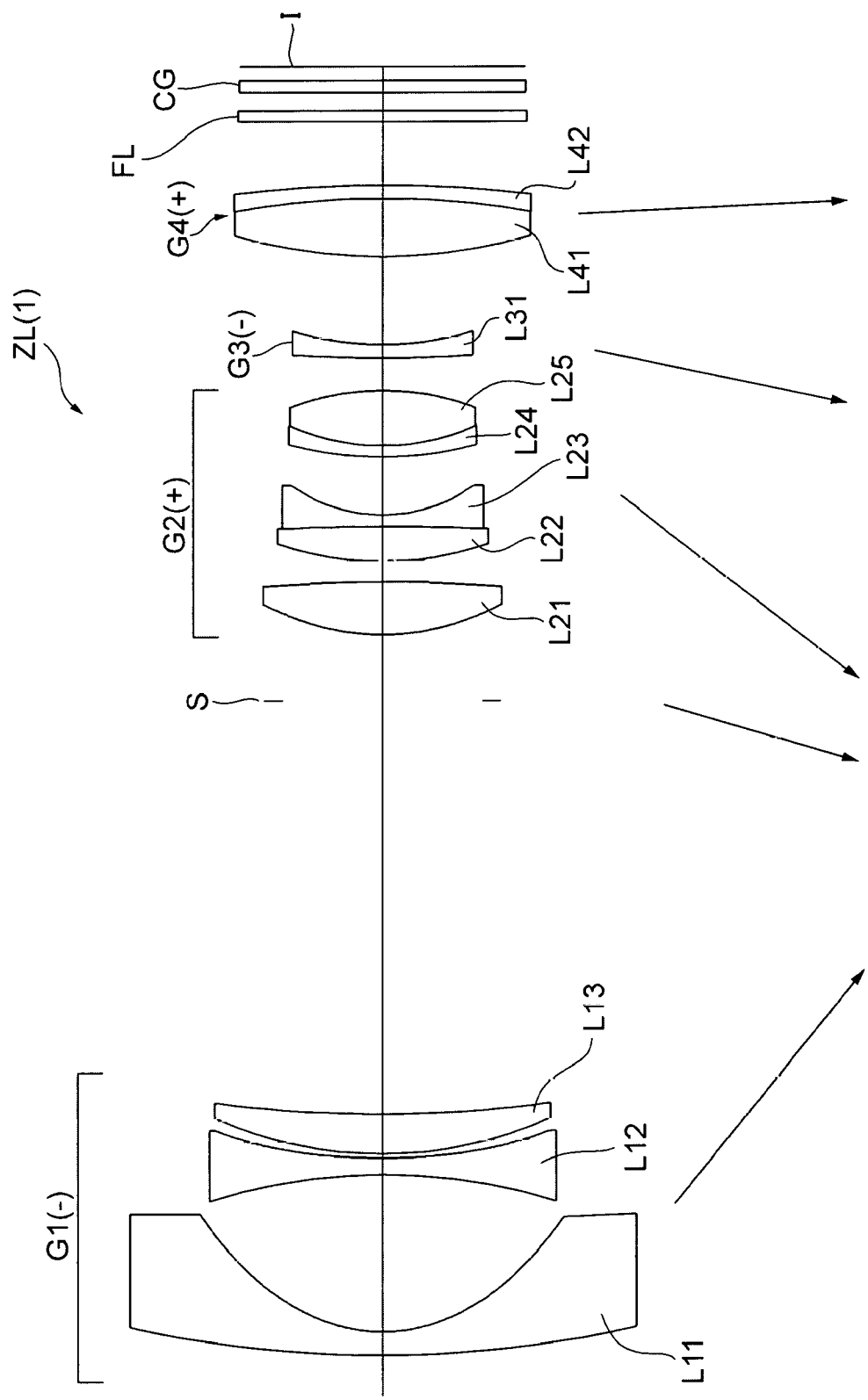

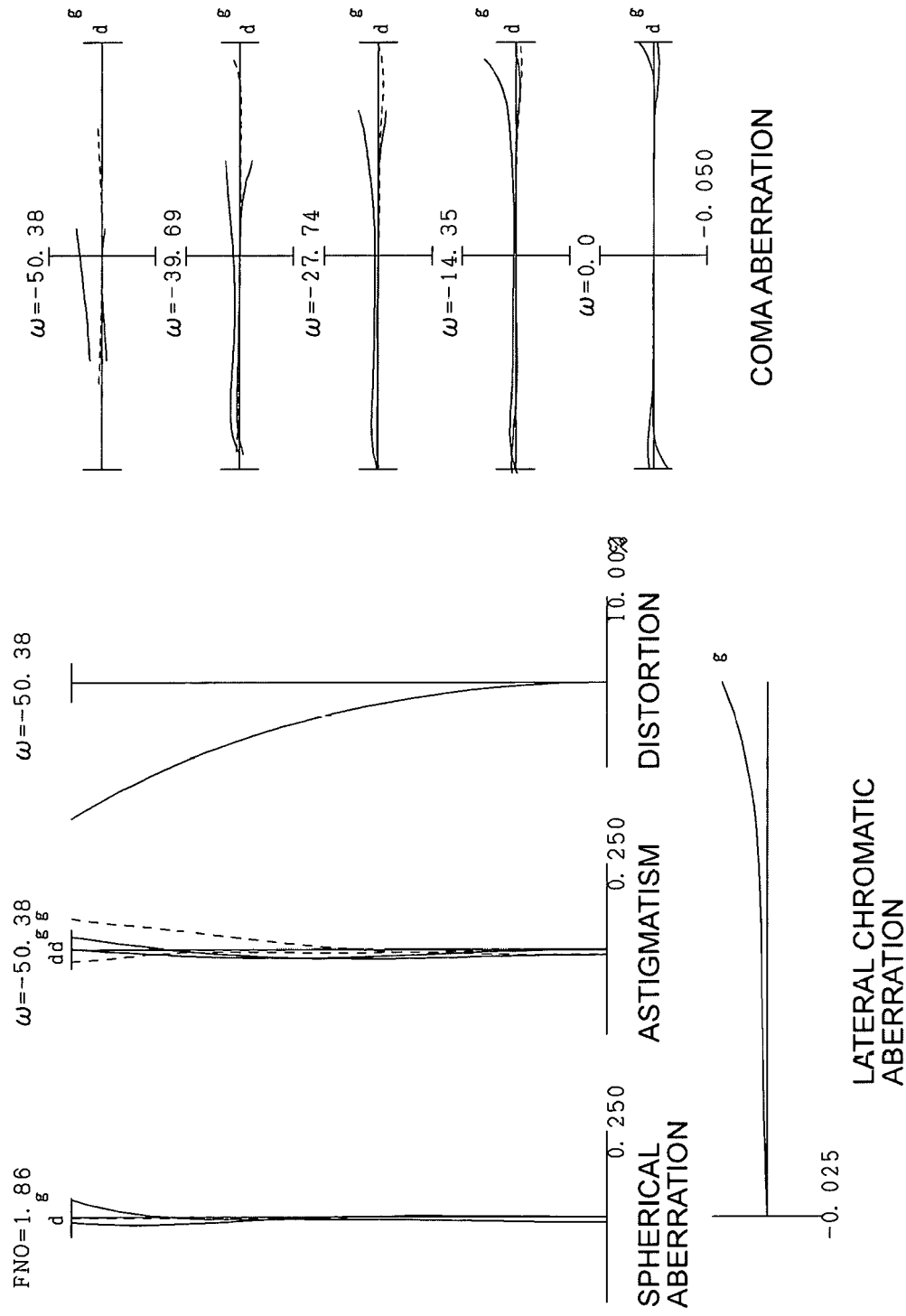

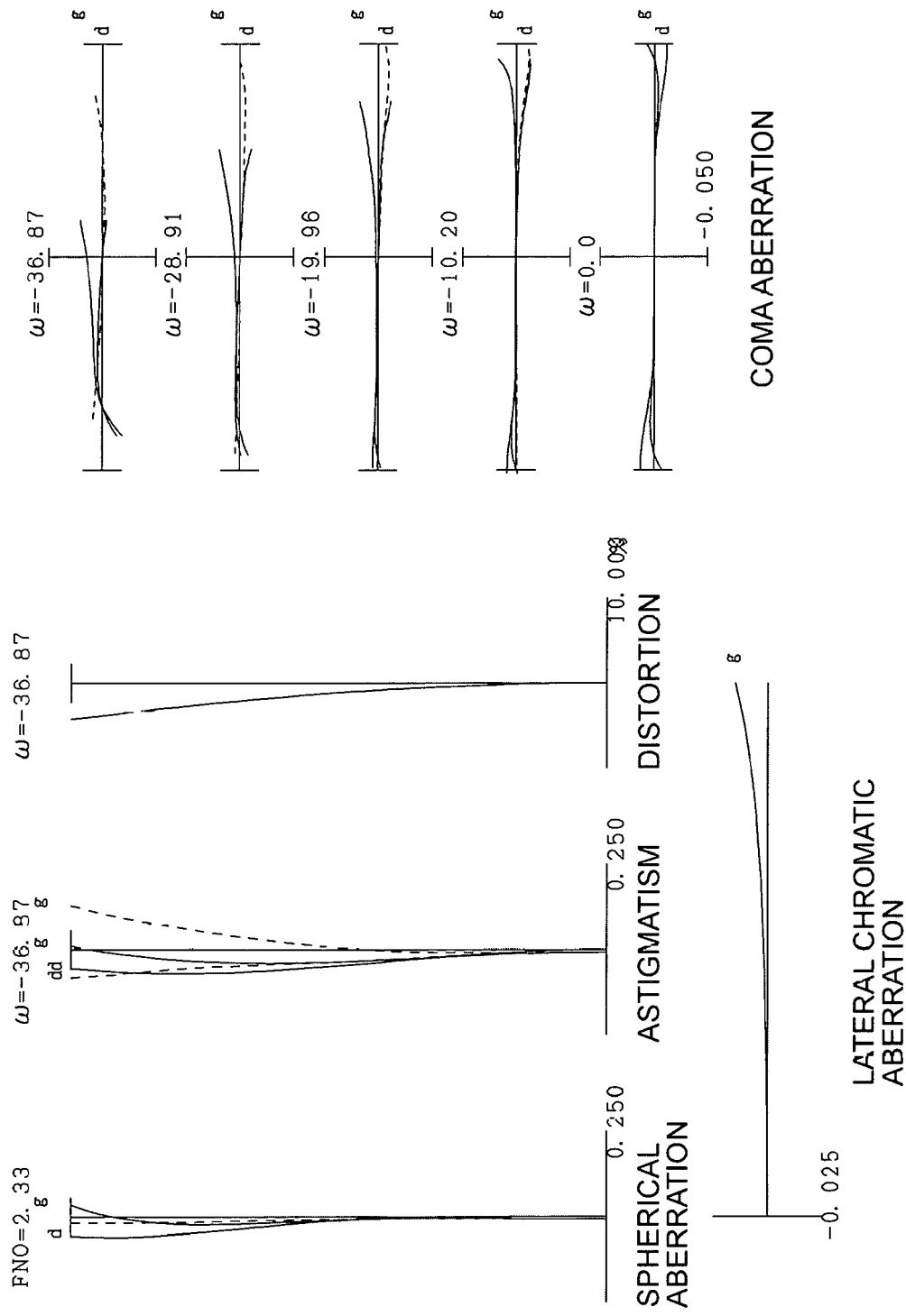

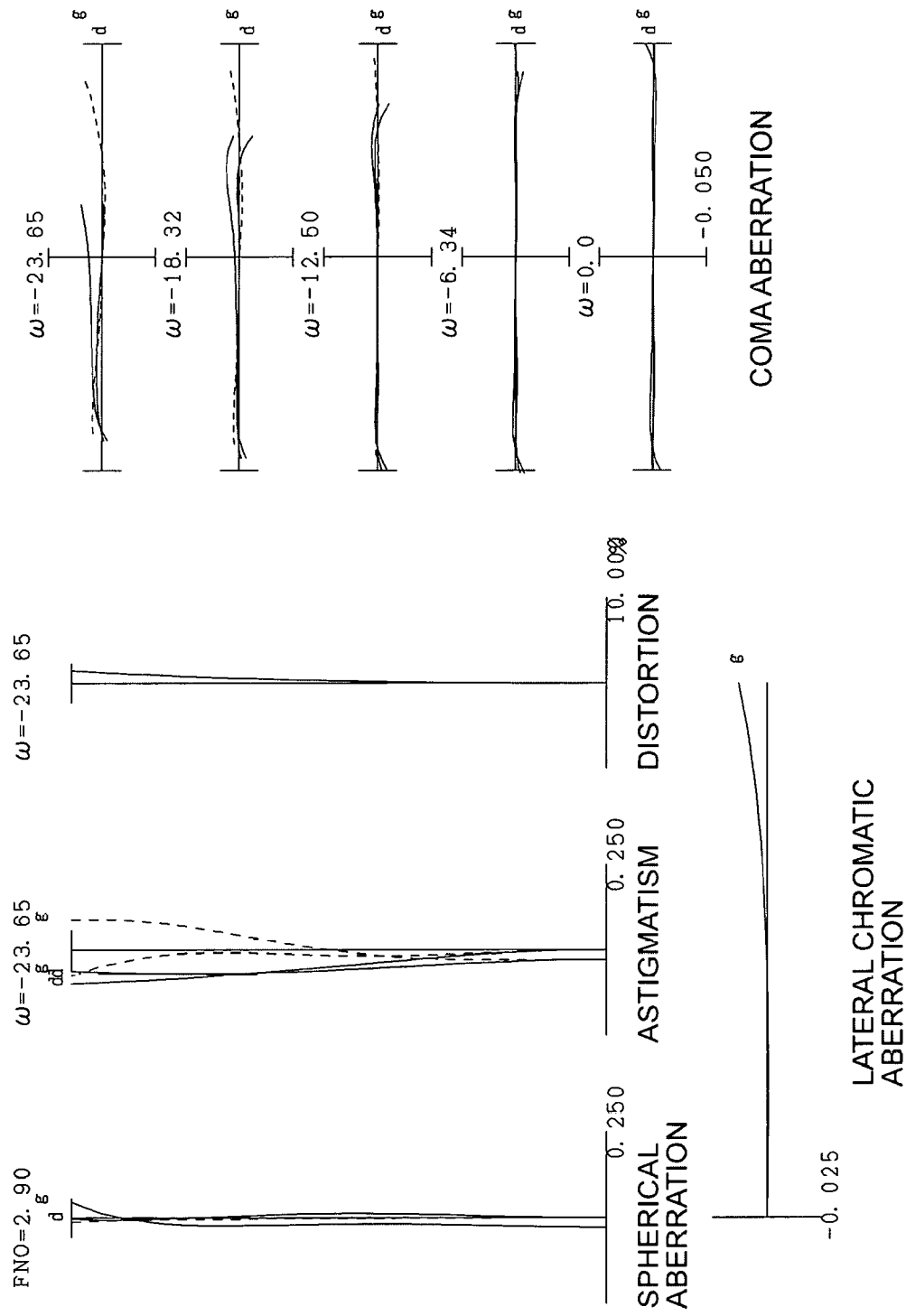

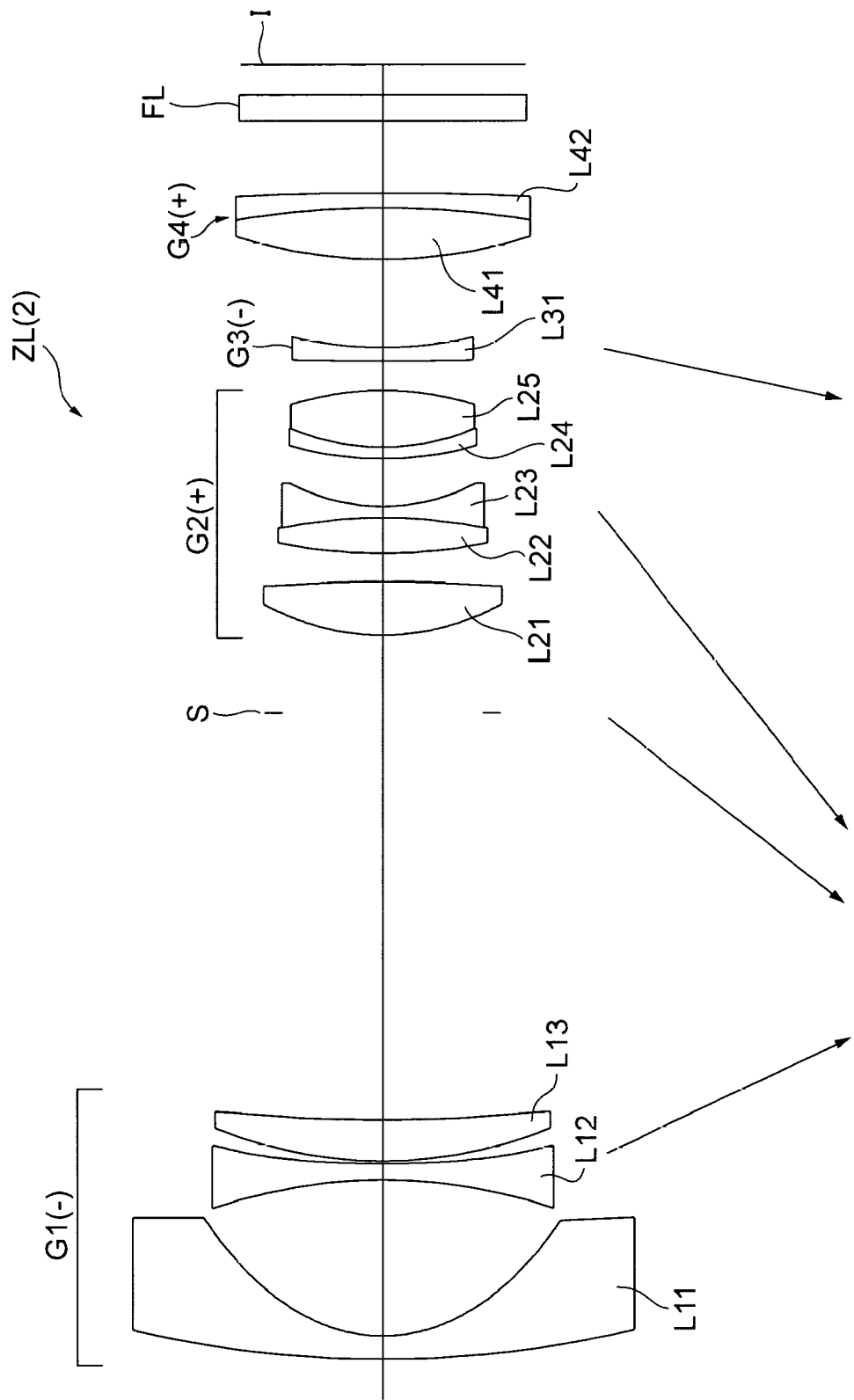

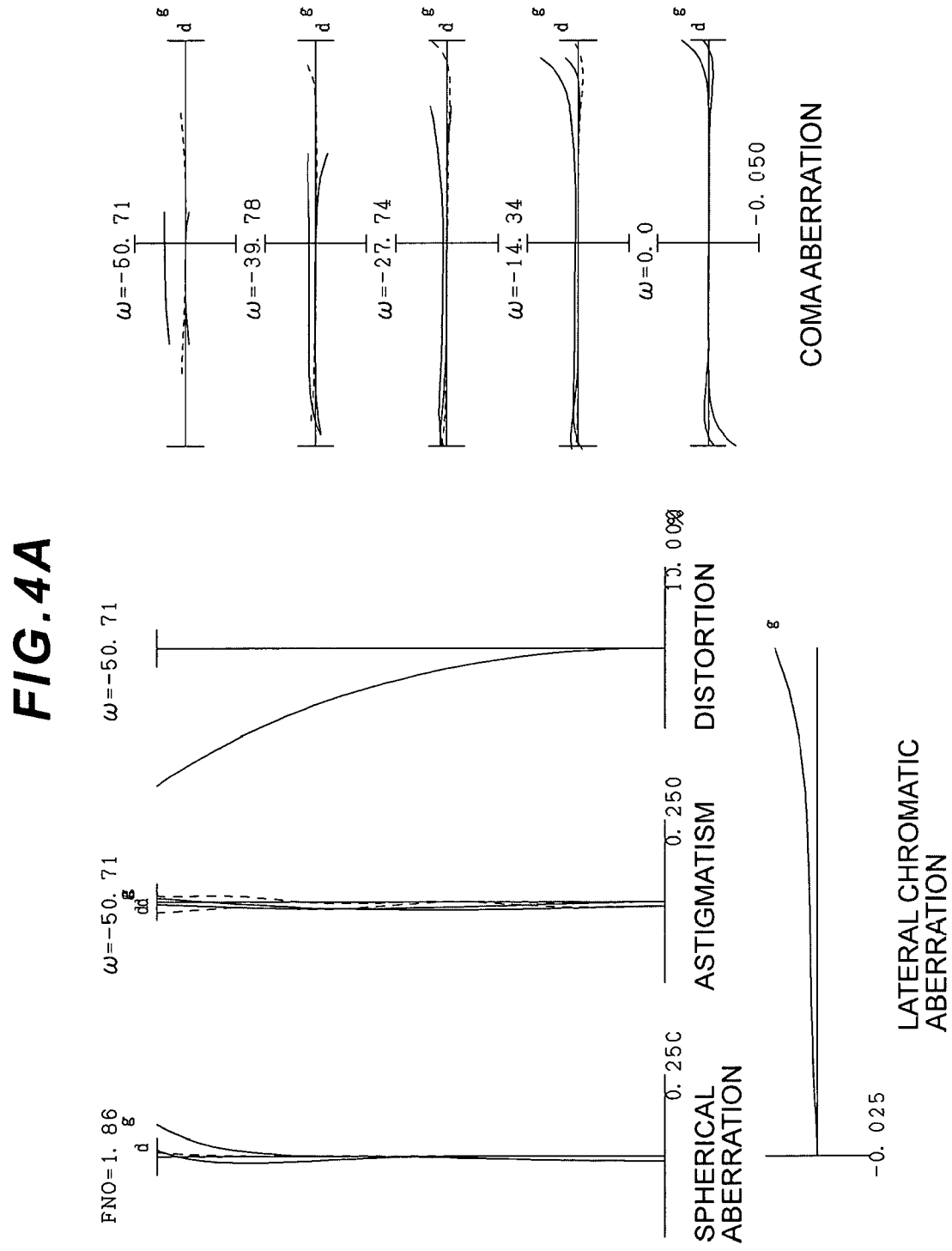

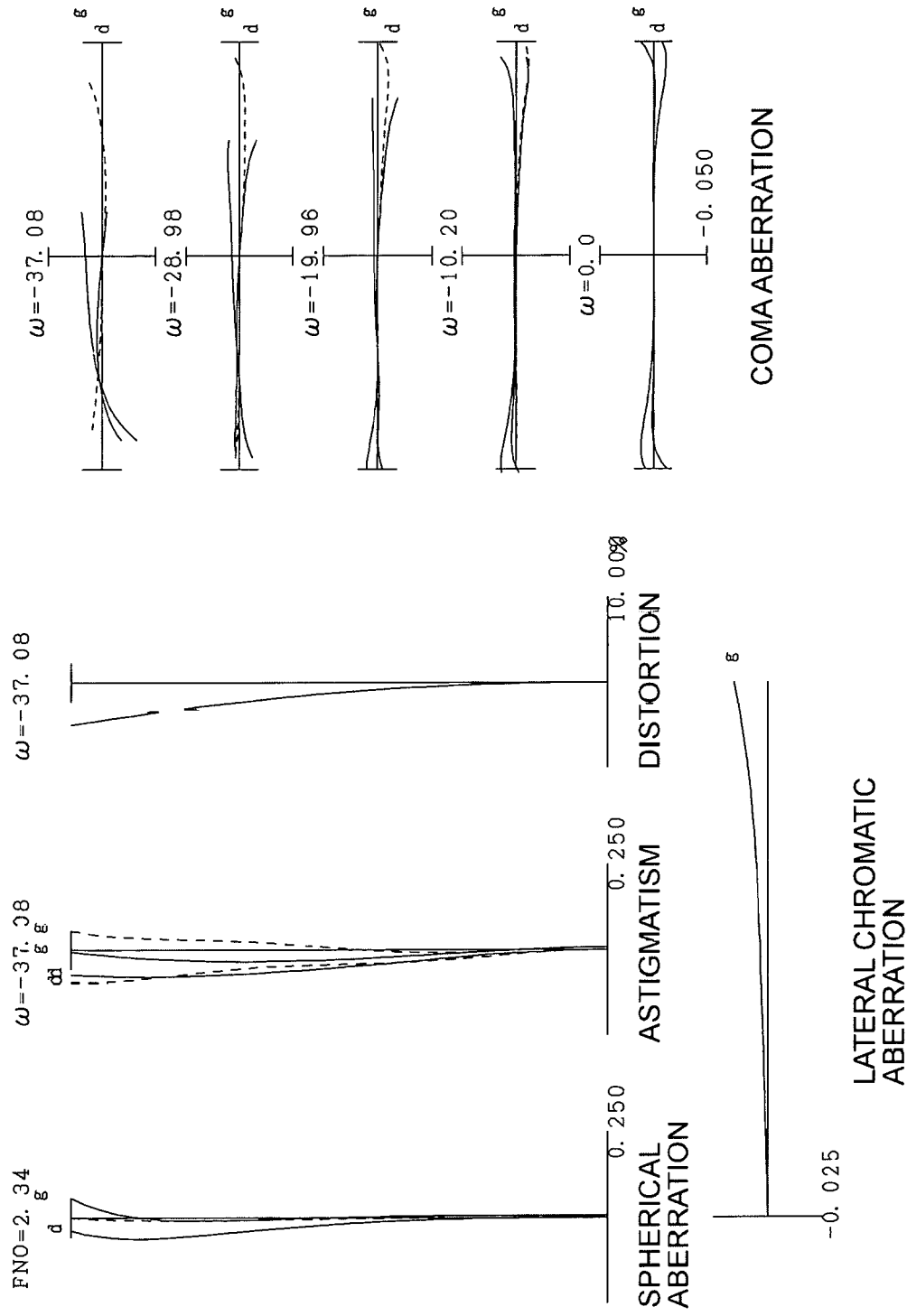

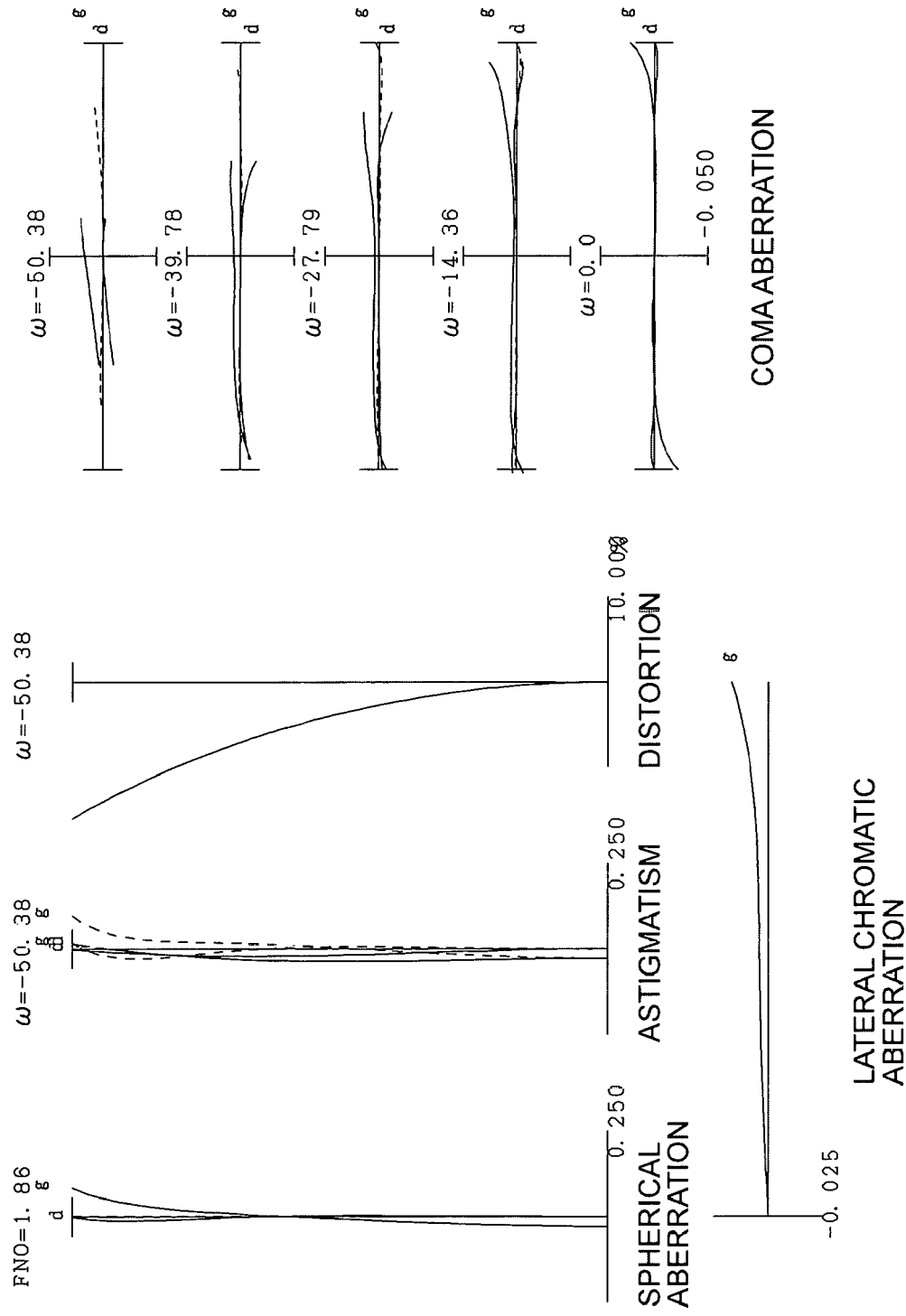

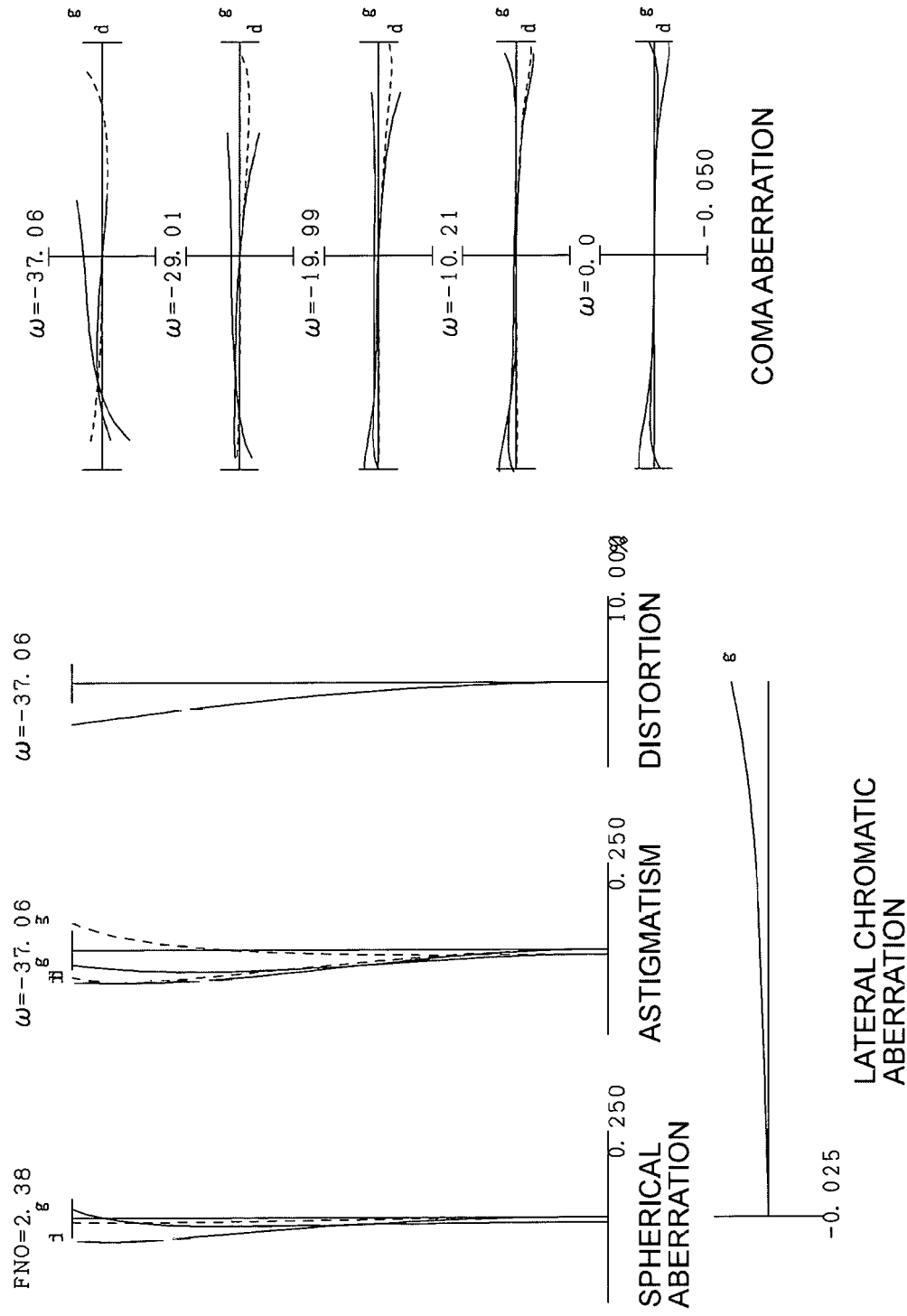

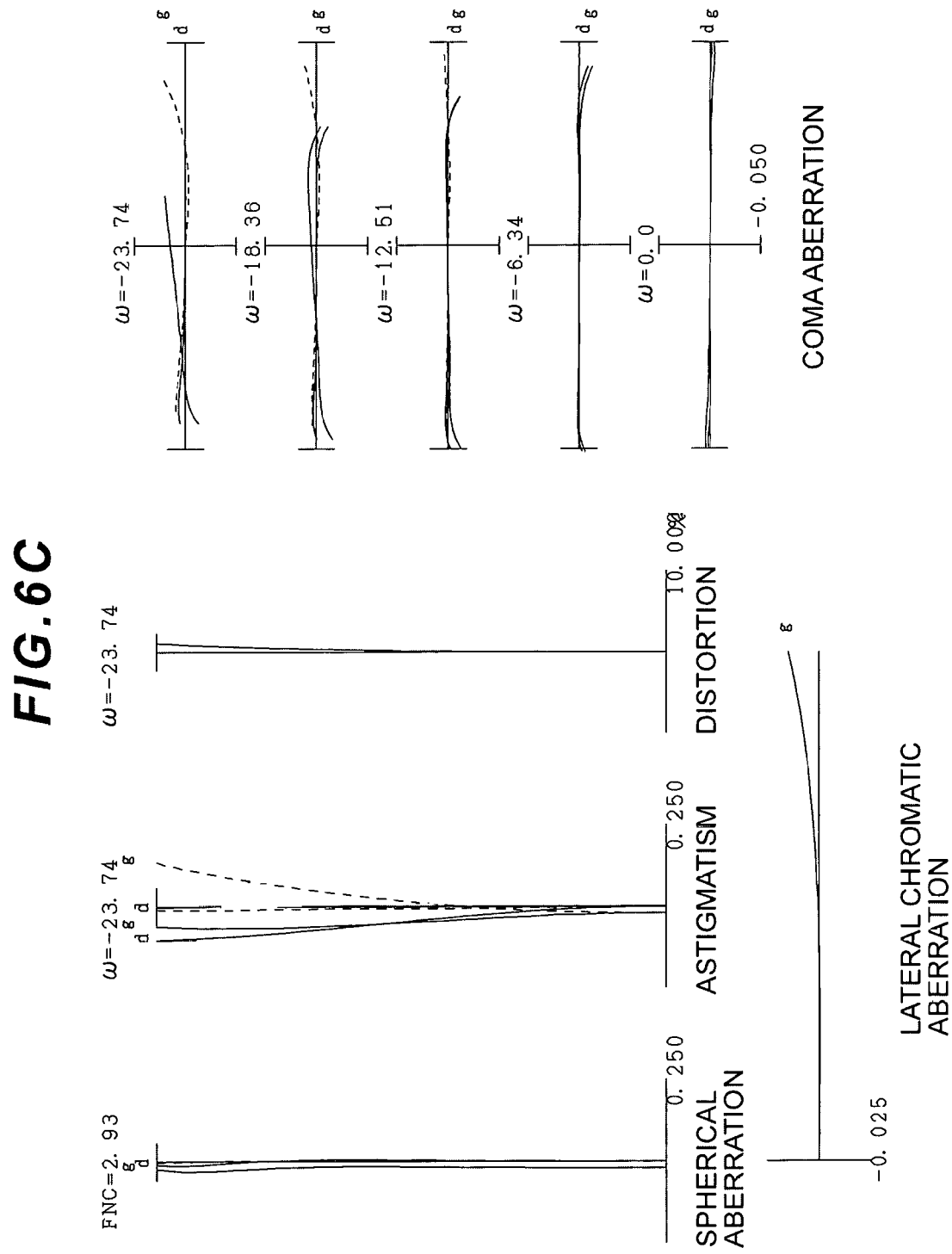

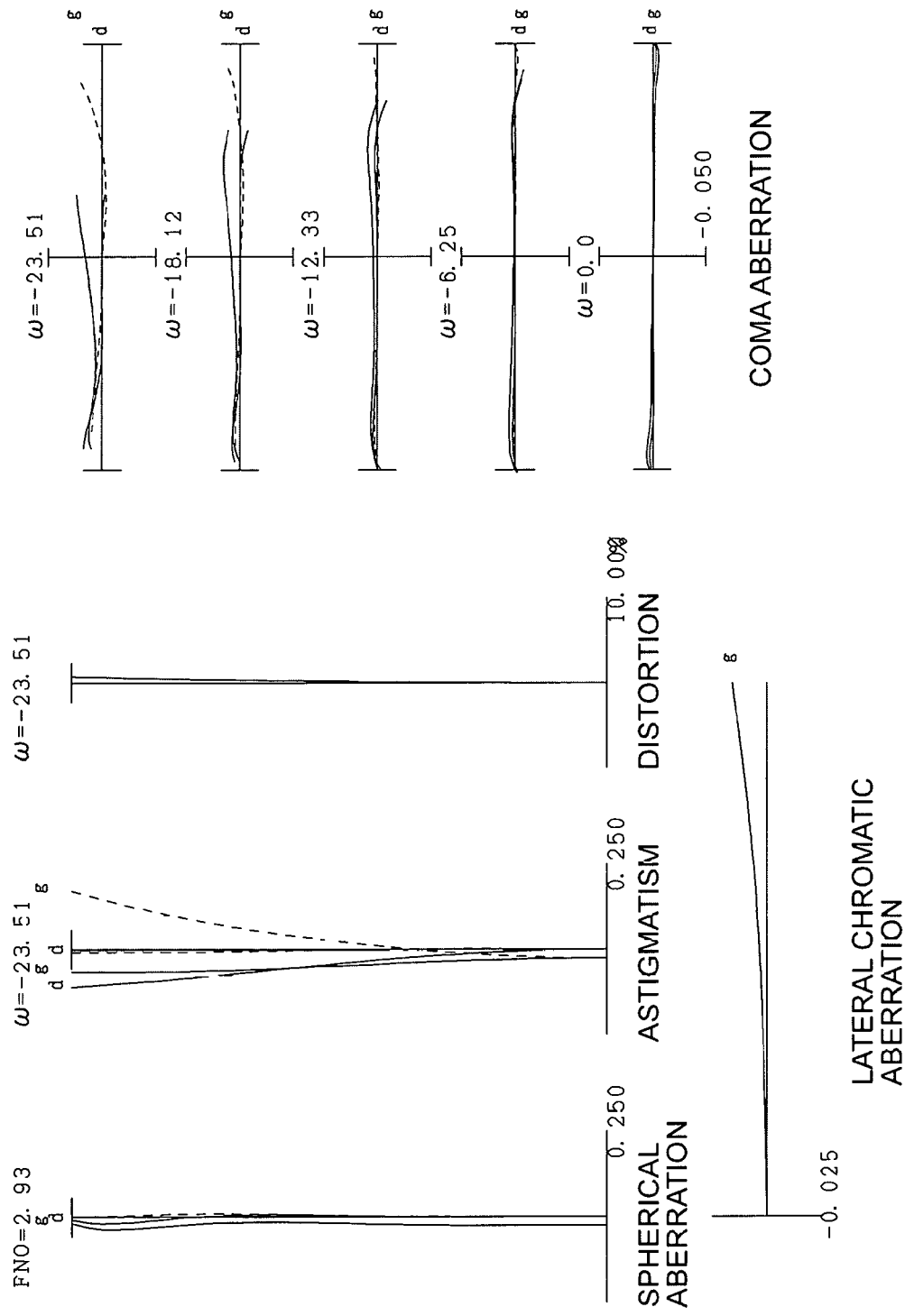

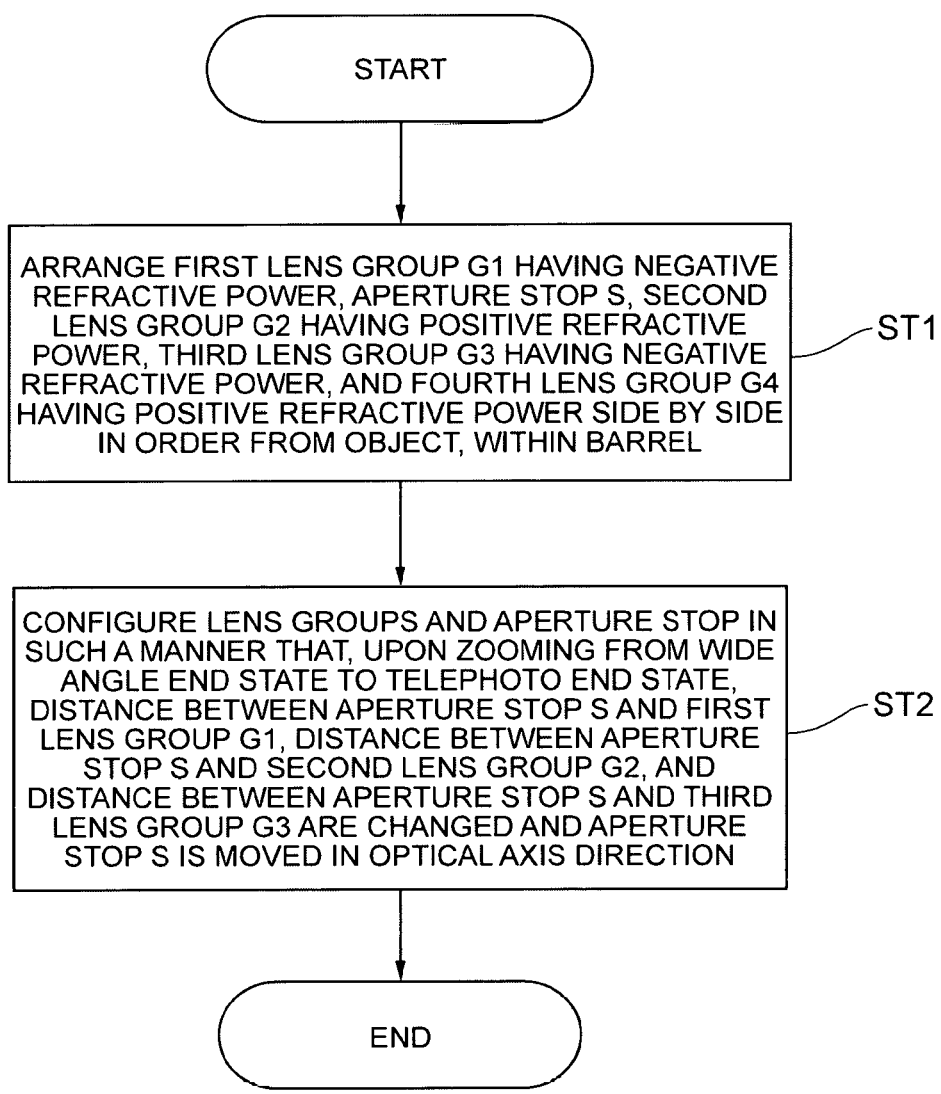

ZOOM LENS, OPTICAL APPARATUS AND METHOD FOR MANUFACTURING THE ZOOM LENS

TECHNICAL FIELD

The present invention relates to a zoom lens, an optical apparatus using the same, and a method for manufacturing the zoom lens.

TECHNICAL BACKGROUND

A conventionally proposed wide angle zoom lens with a zooming rate of about 2× includes a first lens group having negative refractive power and a second lens group having positive refractive power which are disposed in order from an object. In this zoom lens, the lens groups move upon zooming (see, for example, Patent Document 1). The zoom lens according to Patent Document 1 achieves the zooming rate of about 2× with the two lens groups, having negative refractive power and the positive refractive power, moving upon zooming. Recently, an even larger diameter and an even higher zooming rate have been required. In particular, a zoom lens having a wide angle and a large diameter and a high zooming rate suitable for video cameras, electronic still cameras, and the like using a solid state image sensor has been demanded.

PRIOR ARTS LIST

Patent Document
Patent Document 1: Japanese Laid-Open Patent Publication No. 2005-62770 (A)

SUMMARY OF THE INVENTION

A zoom lens according to the present invention comprises, in order from an object: a first lens group having negative refractive power; an aperture stop; a second lens group having positive refractive power; a third lens group having negative refractive power; and a fourth lens group having positive refractive power, and is configured in such a manner that upon zooming from a wide angle end state to a telephoto end state, a distance between the aperture stop and the first lens group, a distance between the aperture stop and the second lens group, and a distance between the aperture stop and the third lens group are changed and the aperture stop is moved in an optical axis direction.

An optical apparatus according to the present invention comprises the zoom lens described above.

A method for manufacturing according to the present invention is a method for manufacturing a zoom lens including, in order from an object: a first lens group having negative refractive power; an aperture stop; a second lens group having positive refractive power; a third lens group having negative refractive power; and a fourth lens group having positive refractive power, and the method comprises: arranging the first to the fourth lens groups and the aperture stop within a lens barrel in such a manner that, upon zooming from a wide angle end state to a telephoto end state, a distance between the aperture stop and the first lens group, a distance between the aperture stop and the second lens group, and a distance between the aperture stop and the third lens group are changed and the aperture stop is moved in an optical axis direction.

BRIEF DESCRIPTION OF THE DRAWINGS

FIG. 1 is a cross-sectional diagram illustrating a lens configuration of a zoom lens according to Example 1 of the present embodiment.

FIGS. 2A, 2B, and 2C are graphs showing various aberrations of the zoom lens according to Example 1 respectively in a wide angle end state, an intermediate focal length state, and a telephoto end state.

FIG. 3 is a cross-sectional diagram illustrating a lens configuration of a zoom lens according to Example 2 of the present embodiment.

FIGS. 4A, 4B, and 4C are graphs showing various aberrations of the zoom lens according to Example 2 respectively in the wide angle end state, the intermediate focal length state, and the telephoto end state.

FIGS. 6A, 6B, and 6C are graphs showing various aberrations of the zoom lens according to Example 3 respectively in the wide angle end state, the intermediate focal length state, and the telephoto end state.

FIGS. 8A, 8B, and 8C are graphs showing various aberrations of the zoom lens according to Example 4 respectively in the wide angle end state, the intermediate focal length state, and the telephoto end state.

FIG. 10 is a flowchart illustrating a method for manufacturing the zoom lens according to the present embodiment.

DESCRIPTION OF THE EMBODIMENTS

A zoom lens and an optical apparatus according to the present embodiment are described below with reference to the drawings. As illustrated in FIG. 1, a zoom lens ZL(1) as an example of a zoom lens ZL according to the present embodiment includes, in order from the object: a first lens group G1 having negative refractive power; an aperture stop S; a second lens group G2 having positive refractive power; a third lens group G3 having negative refractive power; and a fourth lens group G4 having positive refractive power. In this zoom lens ZL, the first to the fourth lens groups G1 to G4 and the aperture stop S each move in the optical axis direction upon zooming from a wide angle end state to a telephoto end state as illustrated by an arrow in FIG. 1. Thus, a distance between adjacent lens groups as well as distances between the aperture stops S and the first lens group G1, between the aperture stop S and the second lens group G2, and between the aperture stop S and the third lens group G3 change upon zooming.

Figure 5:
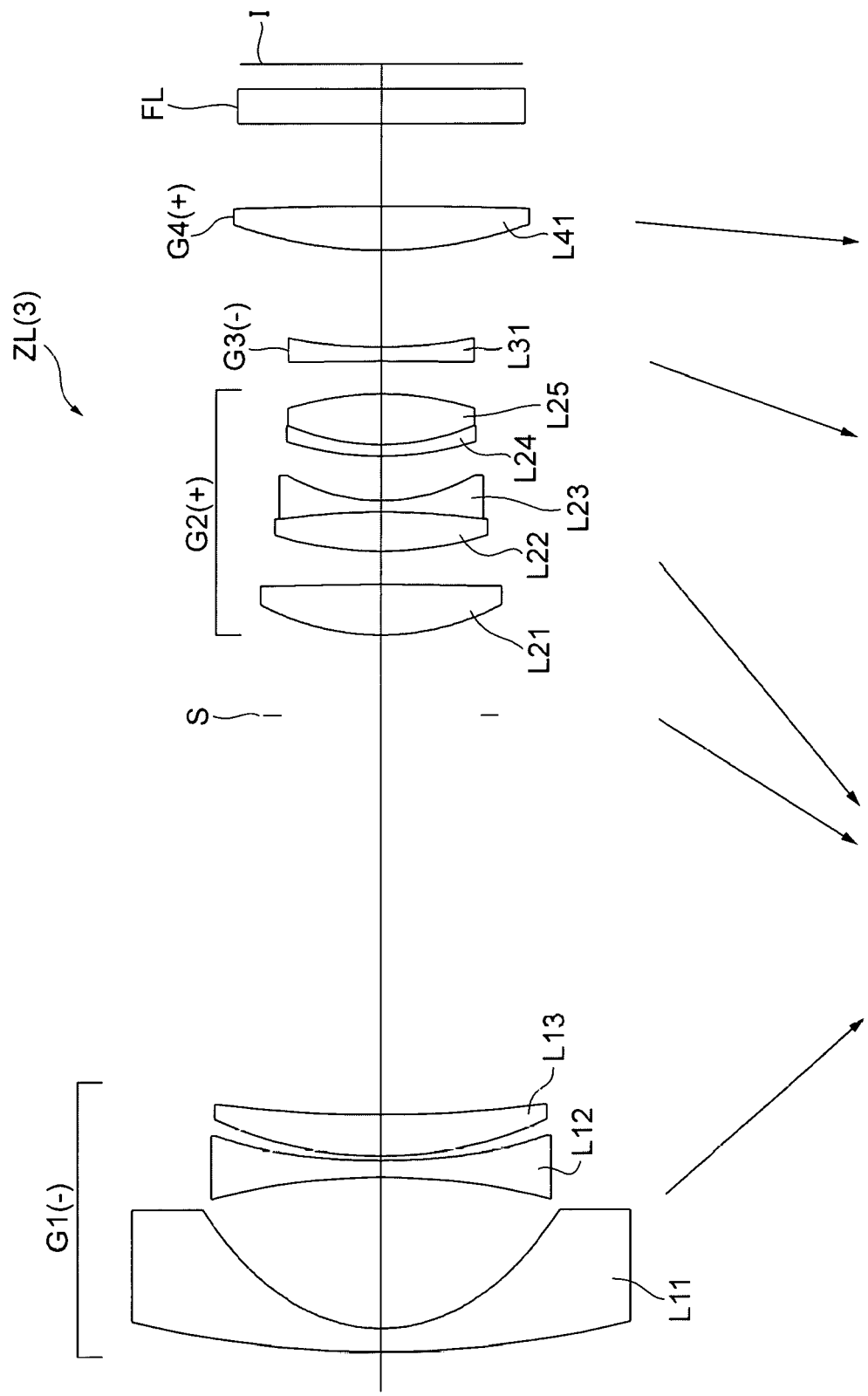
FIG. 5 is a cross-sectional diagram illustrating a lens configuration of a zoom lens according to Example 3 of the present embodiment.
Figure 7:
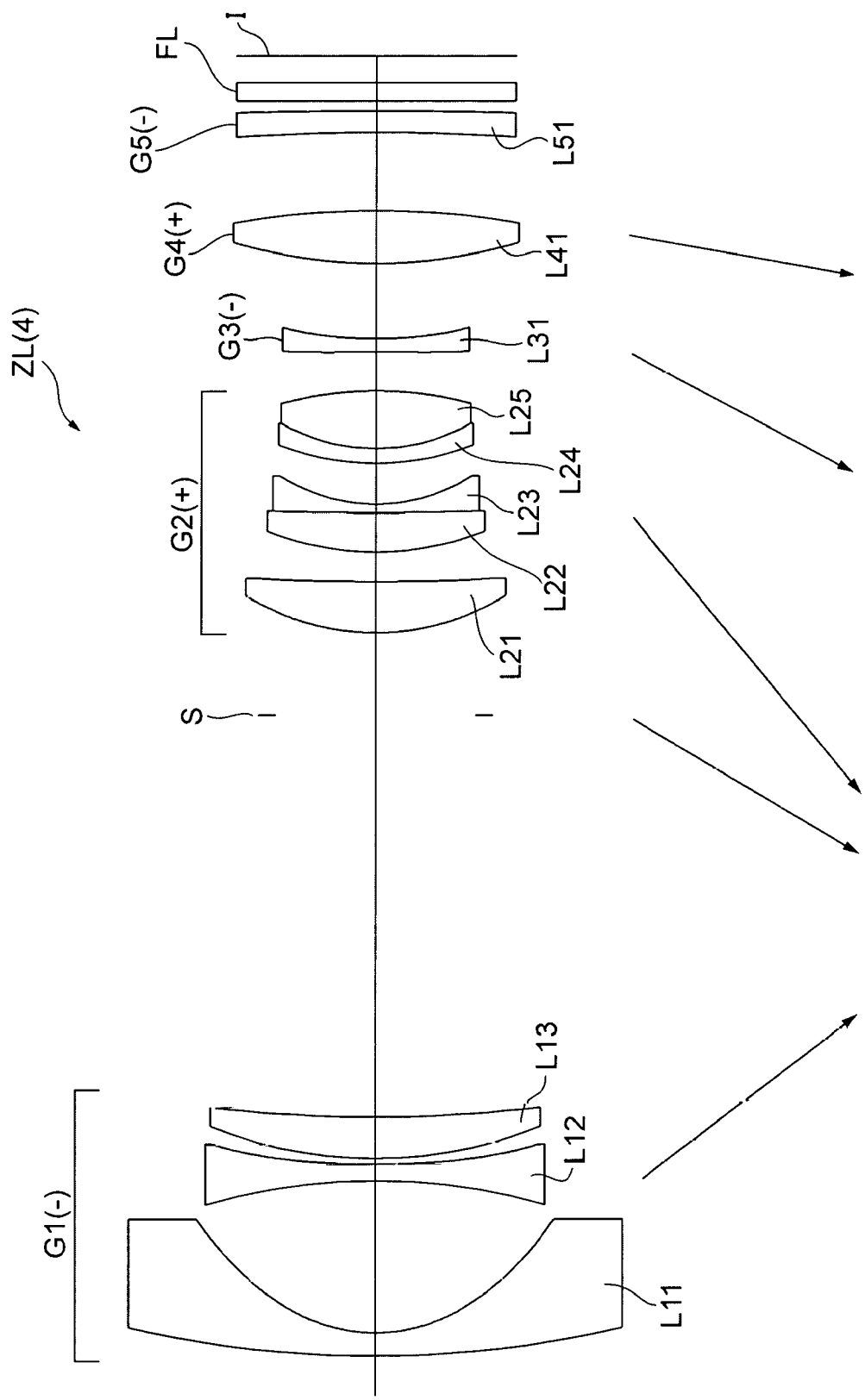
FIG. 7 is a cross-sectional diagram illustrating a lens configuration of a zoom lens according to Example 4 of the present embodiment.

The zoom lens ZL according to the present embodiment may also be a zoom lens ZL (2) illustrated in FIG. 3, a zoom lens ZL (3) illustrated in FIG. 5, or a zoom lens ZL(4) illustrated in FIG. 7.

With this configuration of the zoom lens ZL according to the present embodiment, a wider angle and a higher zooming ratio can be achieved while maintaining the size of the entire lens and without increasing astigmatism and a chromatic aberration. With the present embodiment, a zoom lens suitable for video cameras, electronic still cameras, and the like using a solid state image sensor and the like can be obtained.

With the configuration described above, the zoom lens ZL according to the present embodiment preferably satisfies the following conditional expression (1).

$$3.00<D1/D2<7.00 \tag{1}$$

where,

D1 denotes the distance between the first lens group and the aperture stop in the wide angle end state, and D2 denotes the distance between the aperture stop and the second lens group.

A value lower than the lower limit value of the conditional expression (1), defining an appropriate range of ratios of the distance between the aperture stop and the second lens group to the distance between the first lens group and the aperture stop, results in an increase in a coma aberration and the astigmatism, and thus is not preferable. To guarantee the effects of the present embodiment, the lower limit value of the conditional expression (1) is preferably set to be 3.50. To more effectively guarantee the effects of the present embodiment, the lower limit value of the conditional expression (1) is preferably set to be 4.00. To even more effectively guarantee the effects of the present embodiment, the lower limit value of the conditional expression (1) is preferably set to be 4.50.

A value higher than the upper limit value of the conditional expression (1) also results in an increase in the coma aberration and the astigmatism, and thus is not preferable. To guarantee the effects of the present embodiment, the upper limit value of the conditional expression (1) is preferably set to be 6.70. To more effectively guarantee the effects of the present embodiment, the upper limit value of the conditional expression (1) is preferably set to be 6.40.

The zoom lens ZL according to the present embodiment preferably satisfies the following conditional expression (2).

$$1.20<M2/Ms<1.60 \tag{2}$$

where,

Ms denotes a movement amount of the aperture stop upon zooming from the wide angle end state to the telephoto end state, and M2 denotes a movement amount of the second lens group upon zooming from the wide angle end state to the telephoto end state.

A value lower than the lower limit value of the conditional expression (2), defining a preferable range of the movement amount ratios between the aperture stop and the second lens group, results in an increase in the coma aberration and the astigmatism, and thus is not preferable. To guarantee the effects of the present embodiment, the lower limit value of the conditional expression (2) is preferably set to be 1.25. To more effectively guarantee the effects of the present embodiment, the lower limit value of the conditional expression (2) is preferably set to be 1.30.

A value higher than the upper limit value of the conditional expression (2) also results in an increase in the coma aberration and the astigmatism, and thus is not preferable. To guarantee the effects of the present embodiment, the upper limit value of the conditional expression (2) is preferably set to be 1.55. To more effectively guarantee the effects of the present embodiment, the upper limit value of the conditional expression (2) is preferably set to be 1.50. To even more effectively guarantee the effects of the present embodiment, the upper limit value of the conditional expression (2) is preferably set to be 1.45.

The zoom lens ZL according to the present embodiment preferably satisfies the following conditional expression (3).

$$1.10<TLw/TLt<1.30 \tag{3}$$

where,

TLw denotes a total length of the zoom lens in the wide angle end state, and

TLt denotes a total length of the zoom lens in the telephoto end state.

The conditional expression (3) is for setting a preferable range of ratios of the total length in the wide angle end state to the total length in the telephoto end state. The total length is an air equivalent total length. A value lower than the lower limit value of the conditional expression results in an increase in a spherical aberration and an on-axis chromatic aberration, and thus is not preferable. To guarantee the effects of the present embodiment, the lower limit value of the conditional expression (3) is preferably set to be 1.12. To more effectively guarantee the effects of the present embodiment, the lower limit value of the conditional expression (3) is preferably set to be 1.14.

A value higher than the upper limit value of the conditional expression (3) results in an increase in the astigmatism and distortion, and thus is not preferable. To guarantee the effects of the present embodiment, the upper limit value of the conditional expression (3) is preferably set to be 1.26. To more effectively guarantee the effects of the present embodiment, the upper limit value of the conditional expression (3) is preferably set to be 1.22.

The zoom lens ZL according to the present embodiment preferably satisfies the following conditional expression (4).

$$0.80<-\beta 2t<1.10 \tag{4}$$

where, $\beta 2t$ denotes a magnification of the second lens group in the telephoto end state.

The conditional expression (4) defines a range of appropriate magnifications of the second lens group in the telephoto end state. A value lower than the lower limit value of the conditional expression results in an increase in the astigmatism and the distortion, and thus is not preferable. To guarantee the effects of the present embodiment, the lower limit value of the conditional expression (4) is preferably set to be 0.84. To more effectively guarantee the effects of the present embodiment, the lower limit value of the conditional expression (4) is preferably set to be 0.88.

A value higher than the upper limit value of the conditional expression (4) results in an increase in the spherical aberration and the on-axis chromatic aberration, and thus is not preferable. To guarantee the effects of the present embodiment, the upper limit value of the conditional expression (4) is preferably set to be 1.05. To more effectively guarantee the effects of the present embodiment, the upper limit value of the conditional expression (4) is preferably set to be 1.00.

The zoom lens ZL according to the present embodiment preferably satisfies the following conditional expression (5).

$$1.30<\beta 3w<1.90 \tag{5}$$

where, $\beta 3w$ denotes a magnification of the third lens group in the wide angle end state.

The conditional expression (5) defines a range of appropriate magnifications of the third lens group in the wide angle end state. A value lower than the lower limit value of the conditional expression results in an increase in the coma aberration and the astigmatism, and thus is not preferable. To guarantee the effects of the present embodiment, the lower limit value of the conditional expression (5) is preferably set to be 1.35. To more effectively guarantee the effects of the present embodiment, the lower limit value of the conditional expression (5) is preferably set to be 1.40. To even more effectively guarantee the effects of the present embodiment, the lower limit value of the conditional expression (5) is preferably set to be 1.45.

A value higher than the upper limit value of the conditional expression (5) results in an increase in the coma aberration, and thus is not preferable. To guarantee the effects of the present embodiment, the upper limit value of the conditional expression (5) is preferably set to be 1.80. To more effectively guarantee the effects of the present embodiment, the upper limit value of the conditional expression (5) is preferably set to be 1.70. To even more effectively guarantee the effects of the present embodiment, the upper limit value of the conditional expression (5) is preferably set to be 1.60.

The zoom lens ZL according to the present embodiment preferably satisfies the following conditional expression (6).

$$-0.30 < (Rn2+Rn1)/(Rn2-Rn1) < 1.00 \quad (6)$$

where,

Rn1 denotes a radius of curvature of an object-side surface of a negative lens second closest to the object in the first lens group, and Rn2 denotes a radius of curvature of an image-side surface of the negative lens second closest to the object in the first lens group.

The conditional expression (6) defines a range of appropriate shape factors of the negative lens second closest to the object. A value lower than the lower limit value of the conditional expression results in an increase in the coma aberration and the astigmatism, and thus is not preferable. To guarantee the effects of the present embodiment, the lower limit value of the conditional expression (6) is preferably set to be −0.20. To more effectively guarantee the effects of the present embodiment, the lower limit value of the conditional expression (6) is preferably set to be −0.10. To even more effectively guarantee the effects of the present embodiment, the lower limit value of the conditional expression (6) is preferably set to be 0.00.

A value higher than the upper limit value of the conditional expression (6) also results in an increase in the coma aberration and the astigmatism, and thus is not preferable. To guarantee the effects of the present embodiment, the upper limit value of the conditional expression (6) is preferably set to be 0.80. To more effectively guarantee the effects of the present embodiment, the upper limit value of the conditional expression (6) is preferably set to be 0.60. To even more effectively guarantee the effects of the present embodiment, the upper limit value of the conditional expression (6) is preferably set to be 0.50.

The zoom lens ZL according to the present embodiment preferably satisfies the following conditional expression (7).

$$0.40 < (R31+R32)/(R31-R32) < 2.50 \quad (7)$$

where,

R31 denotes a radius of curvature of surface closest to the object of the third lens group, and R32 denotes a radius of curvature of surface closest to the image of the third lens group.

The conditional expression (7) defines a range of appropriate shape factors of the third lens group. A value lower than the lower limit value of the conditional expression results in an increase in the coma aberration and the astigmatism, and thus is not preferable. To guarantee the effects of the present embodiment, the lower limit value of the conditional expression (7) is preferably set to be 0.45. To more effectively guarantee the effects of the present embodiment, the lower limit value of the conditional expression (7) is preferably set to be 0.50. To even more effectively guarantee the effects of the present embodiment, the lower limit value of the conditional expression (7) is preferably set to be 0.55.

A value higher than the upper limit value of the conditional expression (7) also results in an increase in the coma aberration and the astigmatism, and thus is not preferable. To guarantee the effects of the present embodiment, the upper limit value of the conditional expression (7) is preferably set to be 2.20. To more effectively guarantee the effects of the present embodiment, the upper limit value of the conditional expression (7) is preferably set to be 1.90. To even more effectively guarantee the effects of the present embodiment, the upper limit value of the conditional expression (7) is preferably set to be 1.60.

The zoom lens ZL according to the present embodiment preferably satisfies the following conditional expression (8).

$$0.20 < (R21+R12)/(R21-R12) < 0.90 \quad (8)$$

where,

R12 denotes a radius of curvature of an image-side surface of a lens closest to the object in the first lens group, and R21 denotes a radius of curvature of an object-side surface of a lens second closest to the object in the first lens group.

The conditional expression (8) defines a range of appropriate shape factors of an air lens corresponding to a distance between the lens closest to the object and the lens second closest to the object in the first lens group. A value lower than the lower limit value of the conditional expression results in an increase in the coma aberration and the astigmatism, and thus is not preferable. To guarantee the effects of the present embodiment, the lower limit value of the conditional expression (8) is preferably set to be 0.30. To more effectively guarantee the effects of the present embodiment, the lower limit value of the conditional expression (8) is preferably set to be 0.40. To even more effectively guarantee the effects of the present embodiment, the lower limit value of the conditional expression (8) is preferably set to be 0.50.

A value higher than the upper limit value of the conditional expression (8) also results in an increase in the coma aberration and the astigmatism, and thus is not preferable. To guarantee the effects of the present embodiment, the upper limit value of the conditional expression (8) is preferably set tobe 0.80. To more effectively guarantee the effects of the present embodiment, the upper limit value of the conditional expression (8) is preferably set to be 0.70. To even more effectively guarantee the effects of the present embodiment, the upper limit value of the conditional expression (8) is preferably set to be 0.60.

The zoom lens ZL according to the present embodiment preferably satisfies the following conditional expression (9).

$$39.00° < \omega W < 70.00° \quad (9)$$

where, $\omega w$ denotes a half angle of view in the wide angle end state.

The conditional expression (9) is a conditional expression for setting an optimum value of the half angle of view in the wide angle end state. Various aberrations, such as the coma aberration, a curvature of field, and the distortion, can be successfully corrected while guaranteeing a wide halt angle of view, when this conditional expression is satisfied. A value lower than the lower limit value of the conditional expression (9) leads to a small angle of view, resulting in an increase in these aberrations, and thus is not preferable. To guarantee the effects of the present embodiment, the lower limit value of the conditional expression (9) is preferably set to be 41.00°. To more effectively guarantee the effects of the present embodiment, the lower limit value of the conditional expression (9) is preferably set to be 43.00°. To even more effectively guarantee the effects of the present embodiment, the lower limit value of the conditional expression (9) is preferably set to be 45.00°.

A value higher than the upper limit value of the conditional expression (9) also results in an increase in various aberrations such as the coma aberration, the curvature of field, and the distortion, and thus is not preferable. To guarantee the effects of the present embodiment, the upper limit value of the conditional expression (9) is preferably set to be 60.00°. To more effectively guarantee the effects of the present embodiment, the upper limit value of the conditional expression (9) is preferably set to be 55.00°.

The zoom lens ZL according to the present embodiment preferably satisfies the following conditional expression (10).

$$15.00°<\omega t<34.00° \quad (10)$$

where, $\omega t$ denotes a half angle of view in the telephoto end state.

The conditional expression (10) is a conditional expression for setting an optimum value of the half angle of view in the telephoto end state. Various aberrations, such as the coma aberration, the curvature of field, and the distortion, can be successfully corrected when this conditional expression is satisfied. A value lower than the lower limit value of the conditional expression (10) results in an increase in these aberrations, and thus is not preferable. To guarantee the effects of the present embodiment, the lower limit value of the conditional expression (10) is preferably set to be 16.50°. To more effectively guarantee the effects of the present embodiment, the lower limit value of the conditional expression (10) is preferably set to be 18.00°. To even more effectively guarantee the effects of the present embodiment, the lower limit value of the conditional expression (10) is preferably set to be 20.00°.

A value higher than the upper limit value of the conditional expression (10) also results in an increase in various aberrations such as the coma aberration, the curvature of field, and the distortion, and thus is not preferable. To guarantee the effects of the present embodiment, the upper limit value of the conditional expression (10) is preferably set to be 31.00°. To more effectively guarantee the effects of the present embodiment, the upper limit value of the conditional expression (10) is preferably set to be 28.00°. To even more effectively guarantee the effects of the present embodiment, the upper limit value of the conditional expression (10) is preferably set to be 26.00°.

Preferably, in the zoom lens ZL according to the present embodiment, the first lens group, the second lens group, and the third lens group move in the optical axis direction upon zooming from the wide angle end state to the telephoto end state. With this configuration, a wider angle and a higher zooming ratio can be achieved while maintaining the size of the entire lens and without increasing the astigmatism and the chromatic aberration.

Preferably, in the zoom lens ZL according to the present embodiment, at least a part of lens groups closer on the object side than the closest (most) image-side lens group serves as a focusing lens. With this configuration, variations in various aberrations such as the spherical aberration and the coma aberration upon focusing can be reduced. At least a part of lens groups that is closer on the object side than the closest image-side lens group, serving as the focusing lens, moves toward the image side in the optical axis direction upon focusing from infinity to a short distant object.

Preferably, in the zoom lens ZL according to the present embodiment, at least a part of lens groups closer on the object side than the closest image-side lens group and closer on the image side than the closest object-side lens group serves as the focusing lens. With this configuration, variations in various aberrations such as the spherical aberration and the coma aberration upon focusing can be reduced. At least a part of a lens group closer on the object side than the closest image-side lens group and closer on the image side than the closest object-side lens group, serving as the focusing lens, moves toward the image side in the optical axis direction upon focusing from infinity to a short distant object.

Preferably, in the zoom lenses ZL according to the present embodiment, at least a part of the third lens group serves as the focusing lens. With this configuration, variations in various aberrations such as the spherical aberration and the coma aberration upon focusing can be reduced. At least a part of the third lens group G3, serving as the focusing lens, moves toward the image side in the optical axis direction upon focusing from infinity to a short distant object.

Preferably, in the zoom lenses ZL according to the present embodiment, at least a part of the second lens group is configured to serve as a vibration-proof lens group with a displacement component in a direction orthogonal to the optical axis. With this configuration, variations in various aberrations such as the coma aberration upon camera shake correction can be reduced.

Figure 9:
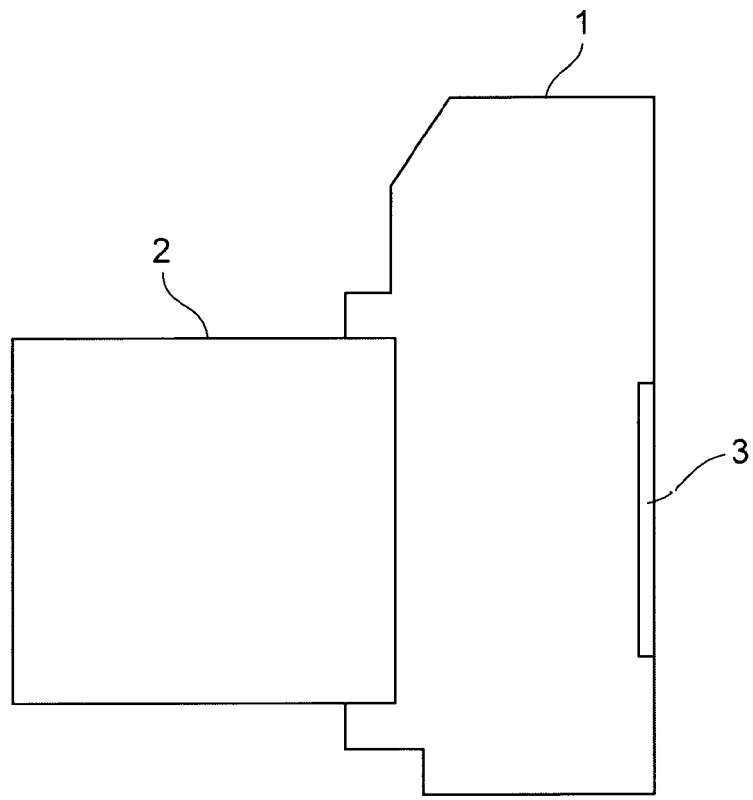
FIG. 9 is a cross-sectional diagram illustrating a configuration of a camera including a zoom lens according to the present embodiment.

The optical apparatus according to the present embodiment includes the zoom lens ZL with the configuration described above. A camera (optical apparatus) including the zoom lens ZL is described, as a specific example, with reference to FIG. 9. This camera 1 is a digital camera including the zoom lens ZL according to the present embodiment serving as an imaging lens 2 as illustrated in FIG. 9. In the camera 1, the imaging lens 2 collects light from an object (subject) (not illustrated), and then the light reaches an image sensor 3. Thus, an image based on the light from the subject is formed with the image sensor 3 to be stored as a subject image in a memory (not illustrated). In this manner, the photographer can capture an image of the subject with the camera 1. The camera may be a mirrorless camera, or may be a single lens reflex camera having a quick return mirror.

With this configuration, the camera 1 that includes the zoom lens ZL serving as the imaging lens 2 and is suitable for a video camera, an electronic still camera, and the like using a solid image sensor can be obtained, and a wider angle and a higher zooming ratio can be achieved without increasing the size of the entire lens and without increasing the astigmatism and the chromatic aberration.

Next, a method for manufacturing the zoom lens ZL described above is described with reference to FIG. 10. First of all, the lens groups are arranged side by side within a barrel in such a manner that the first lens group G1 having negative refractive power, the aperture stop S, the second lens group G2 having positive refractive power, the third lens group G3 having negative refractive power, and the fourth lens group G4 having positive refractive power are disposed in order from the object (step ST1). The lens groups and the aperture stop are configured in such a manner that, upon zooming from the wide angle end state to the telephoto end state, a distance between the aperture stop S and the first lens group G1, a distance between the aperture stop S and the second lens group G2, and a distance between the aperture stop S and the third lens group G3 are changed and the aperture stop S is moved in the optical axis direction (step ST2).

The manufacturing method according to the present embodiment can manufacture a zoom lens having a wide angle and a large diameter and featuring excellent optical performance, with various aberrations successfully corrected.

EXAMPLES

Zoom lenses ZL according to Examples of the present embodiment are described below with reference to the drawings.

FIGS. 1, 3, 5, and 7 are cross-sectional views illustrating configurations and the like of the zoom lenses ZL {ZL(1) to ZL(4)} according to Examples 1 to 4. Arrows below these graphs indicate directions of movement of the first to the fourth lens groups G1 to G4 and the aperture stop S upon zooming from the wide angle end state to the telephoto end state (zooming operation).

In the figures, a combination of a signGandanumber represents each lens group, and a combination of a sign L and a number represents each lens. In each Example, lens groups and the like are each denoted with a combination of the reference sign and numeral independently from other Examples to prevent cumbersomeness due to an excessively wide variety or a large number of signs and numerals. Thus, components in different Examples denoted with the same combination of reference sign and numeral does not necessarily have the same configuration.

Table 1 to Table 4 described below are specification tables of Examples 1 to 4.

In Table [Lens specifications], a surface number represents an order of an optical surface from the object side in a traveling direction of a light beam, R represents a radius of curvature of each optical surface (with a surface having the center of curvature position on the image side provided with a positive value), D represents a distance between each optical surface and the next optical surface on the optical axis, nd represents a refractive index of a material of an optical member with respect to the d-line (wavelength 587.6 nm), and vd represents Abbe number of the material of the optical member based on the d-line. The surface number represents the order of a lens surface from the object along a direction of a light beam. Furthermore, "∞" of the radius of curvature represents a plane or an aperture, and (stop S) represents the aperture stop S. The refractive index nd=1.00000 of air is omitted. An aspherical lens surface has a * mark in the field of surface number and has a paraxial radius of curvature in the field of radius of curvature R.

Specifically, in Table [Overall specifications] including specifications of the whole zoom lens, f represents a focal length of the whole lens system, FNo. represents F number, and w represents a half angle of view (maximum incident angle, unit: °). Back focus (BF) represents back focus that is a distance between a lens last surface and an image surface I on the optical axis upon focusing on infinity, and TL represents the total lens length that is a length obtained by adding BF to a distance between the lens forefront surface and the lens last surface on the optical axis. These values are provided for each of the zooming states including the wide angle end state (Wide), the intermediate focal length state (Middle), and the telephoto end state (Tele).

Table [Aspherical data] has the following formula (a) indicating the shape of an aspherical surface in [Lens specifications]. In the formula, X(y) represents a distance (sag amount) between the tangent plane at the vertex of the aspherical surface and a position on the aspherical surface at a height y along the optical axis direction, R represents a radius of curvature (paraxial radius of curvature) of a reference spherical surface, K represents a conical coefficient, and Ai represents an ith aspherical coefficient. In the formula, "E-n" represents "×10$^{-n}$". For example, 1.234E−05=1.234×10$^{-5}$. A secondary aspherical coefficient A2 is 0, and thus is omitted.

$$X(y)=(y^2/R)/(1+(1-K \times y^2/R^2)^{1/2})+A4 \times y^4+A6 \times y^6+A8 \times y^8+A10 \times y^{10} \quad (a)$$

Table [Variable distance data] represents a surface distance D1 between a surface corresponding to a surface number i appended with "variable" in Table [Lens specifications] and the next surface. For example, in Example 1, surface distances D6, D7, D15, D17, and D20 corresponding to the surfaces with the surface numbers 6, 7, 15, 17, and 20 are illustrated. Furthermore, f represents the focal length of the whole zoom lens.

Table [Lens group data] represents the surface number of the group starting surface (closest object-side surface) of each of the first to the fourth (or fifth) lens groups and a focal length and a lens configuration length of each of the lens groups.

Table [Conditional expression corresponding value] represents values corresponding to the conditional expressions (1) to (10).

The focal length f, the radius of curvature R, the surface distance D and the other units of length described below as all the specification values, which are generally described with "mm" unless otherwise noted should not be construed in a limiting sense because the optical system proportionally expanded or reduced can have a similar or the same optical performance.

The description above commonly applies to all Examples, and thus will not be redundantly described in the description on each Example below.

Example 1

Example 1 is described with reference to FIG. 1 and FIGS. 2A-2C and Table 1. FIG. 1 is a diagram illustrating a lens configuration of a zoom lens ZL (1) according to Example 1 of the present embodiment. This zoom lens ZL (1) includes, in order from an object: a first lens group G1 having negative refractive power; an aperture stop S that moves in the optical axis direction upon zooming; a second lens group G2 having positive refractive power; a third lens group G3 having negative refractive power; and a fourth lens group G4 having positive refractive power, as illustrated in the figure. A sign (+) or (−) provided to a sign of each lens group represents refractive power of the lens group. A filter FL and cover glass CG (protective glass for the image surface I) are provided closer on the image side and closer to the image surface I than the fourth lens group G4. The filter FL includes a lowpass filter, an infrared cut filter, and the like.

All of the first to the fourth lens groups G1 to G4 and the aperture stop S each move in the axis direction upon zooming as indicated by arrows in FIG. 1. Thus, the surfaces distances D6, D7, D15, D17, and D20 among these lens groups are variable, and values of these distances are described in Table [Variable distance data].

The first lens group G1 includes, in order from the object: a negative meniscus lens L11 having a convex surface (1st surface) facing the object; a negative lens L12 having a biconcave shape; and a positive meniscus lens L13 having a convex surface facing the object. A 2nd surface of the negative meniscus lens L11 on the image side and a 4th surface of the negative lens L12 on the image side are aspherical surfaces.

The second lens group G2 includes, in order from the object: a positive lens L21 having a biconvex shape; a positive lens L22 having a biconvex shape; a negative lens L23 having a biconcave shape; a negative meniscus lens L24 having a convex surface facing the object; and a positive lens L25 having a biconvex shape. The positive lens L22 and the negative lens L23 are integrally cemented to form a cemented lens. The negative meniscus lens L24 and the positive lens L25 are also integrally cemented to form a cemented lens. Both surfaces (8th and 9th surfaces) of the positive lens L21, and a 15th surface of the positive lens L25 on the image side are aspherical surfaces.

The third lens group G3 includes a negative meniscus lens L31 having a convex surface facing the object. A 17th surface of the negative meniscus lens L31 on the image side is an aspherical surface.

The fourth lens group G4 includes, in order from the object: a positive lens L41 having a biconvex shape; and a negative meniscus lens L42 having a convex surface facing the image, and the lenses L41 and L42 are integrally cemented to form a cemented lens.

An aperture stop S, for adjusting the amount of light, is provided between the first lens group G1 and the second lens group G2. The aperture stop S is moved in the optical axis direction, independently from the first to the fourth lens groups G1 to G4, upon zooming.

In the zoom lens ZL(1), the negative meniscus lens L31 in the third lens group G3 moves toward the image surface upon focusing from infinity (long distant object) to a short distant object.

In the zoom lenses ZL (1), at least a part of the second lens group G2 (including the entire second lens group G2 or any one of or any combination of the lenses L21 to L25 of the second lens group G2) serves as a vibration-proof lens group, with a displacement component in a direction orthogonal to the optical axis, to be in charge of image blur correction on the image surface I (image stabilization, camera shake correction).

Table 1 below lists specification values of the optical system according to Example 1.

TABLE 1

[Lens data]

| Surface number | R | D | nd | vd |
|---|---|---|---|---|
| 1 | 96.674 | 1.904 | 1.6935 | 53.2 |
| 2* | 13.289 | 12.865 | | |
| 3 | −47.357 | 1.360 | 1.5135 | 63.6 |
| 4* | 53.421 | 0.324 | | |
| 5 | 33.783 | 3.264 | 2.0007 | 25.5 |
| 6 | 104.441 | (variable) | | |

TABLE 1-continued

[Lens data]

| Surface number | R | D | nd | vd |
|---|---|---|---|---|
| 7 | ∞ | (variable) | (stop S) | |
| 8* | 19.091 | 4.352 | 1.7433 | 49.3 |
| 9* | −91.087 | 1.708 | | |
| 10 | 26.607 | 2.856 | 1.5932 | 67.9 |
| 11 | −194.792 | 0.952 | 1.7380 | 32.3 |
| 12 | 12.643 | 4.770 | | |
| 13 | 28.917 | 0.952 | 1.7283 | 28.4 |
| 14 | 18.811 | 4.488 | 1.4971 | 81.5 |
| 15* | −21.776 | (variable) | | |
| 16 | 123.288 | 1.088 | 1.6935 | 53.2 |
| 17* | 25.904 | (variable) | | |
| 18 | 43.481 | 4.760 | 1.8040 | 46.6 |
| 19 | −68.266 | 1.088 | 1.7283 | 28.4 |
| 20 | −101.267 | (variable) | | |
| 21 | ∞ | 0.900 | 1.5168 | 63.9 |
| 22 | ∞ | 1.500 | | |
| 23 | ∞ | 1.000 | 1.5168 | 63.9 |
| 24 | ∞ | (BF) | | |

[Overall specifications]

| | Wide | Middle | Tele |
|---|---|---|---|
| f | 9.38 | 15.16 | 24.48 |
| Aperture stop diameter | 16.32 | 16.32 | 16.32 |
| Fno. | 1.86 | 2.33 | 2.90 |
| 2ω | 50.38 | 36.87 | 23.65 |
| BF | 1.14 | 1.14 | 1.14 |
| Air equivalent BF | 9.14 | 9.21 | 8.68 |
| TL | 105.84 | 92.04 | 89.28 |
| Air equivalent TL | 105.20 | 91.40 | 88.64 |

[Aspherical data]

| | K | A4 | A6 | A8 | A10 |
|---|---|---|---|---|---|
| 2nd surface | 0.080 | 1.335E−05 | 8.097E−09 | 5.896E−11 | 2.535E−14 |
| 4th surface | 1.000 | 1.121E−05 | 1.506E−08 | −5.526E−11 | 1.418E−13 |
| 8th surface | −1.684 | 3.167E−05 | −4.932E−08 | 0.000E+00 | 0.000E+00 |
| 9th surface | 1.000 | 1.468E−05 | −1.809E−08 | 0.000E+00 | 0.000E+00 |
| 15th surface | 1.000 | −9.348E−06 | −3.608E−08 | −7.025E−10 | −7.408E−12 |
| 17th surface | 1.000 | 2.161E−05 | 5.468E−08 | −1.462E−09 | 1.043E−11 |

[Variable distance data]

| | Wide | Middle | Tele |
|---|---|---|---|
| f | 9.38 | 15.16 | 24.48 |
| D6 | 33.914 | 17.462 | 4.411 |
| D7 | 5.468 | 0.952 | 0.952 |
| D15 | 2.720 | 6.227 | 12.032 |
| D17 | 7.218 | 10.816 | 15.831 |
| D20 | 5.249 | 5.311 | 4.783 |

[Lens group data]

| Group number | Group starting surface | Group focal length | Lens configuration length |
|---|---|---|---|
| G1 | 1 | −22.417 | 19.717 |
| G2 | 8 | 23.679 | 20.078 |
| G3 | 16 | −47.505 | 1.088 |
| G4 | 18 | 38.025 | 5.848 |

[Conditional Expression Corresponding Value]

D1/D2=6.20      Conditional expression(1)

M2/Ms=1.35      Conditional expression(2)

TLw/TLt=1.19      Conditional expression(3)

−β2t=0.92      Conditional expression(4)

β3w=1.52      Conditional expression(5)

(Rn2+Rn1)/(Rn2−Rn1)=0.06      Conditional expression(6)

(R31+R32)/(R31−R32)=1.53      Conditional expression(7)

(R21+R12)/(R21−R12)=0.56      Conditional expression(8)

ωw=50.38°      Conditional expression(9)

ωt=23.65°      Conditional expression(10)

As can be seen in Table [Conditional expression corresponding value], the zoom lens ZL (1) according to Example 1 illustrated in FIG. 1 satisfies all of the conditional expressions (1) to (10).

FIGS. 2A, 2B, and 2C are graphs showing various aberrations of the zoom lens ZL (1) according to Example 1 upon focusing on infinity, respectively in the wide angle end state, the intermediate focal length state, and the telephoto end state.

It can be seen in these aberration graphs that the zoom lens 15 ZL (1) according to Example 1 can achieve excellent imaging performance with various aberrations successfully corrected from the wide angle end state to the telephoto end state. The distortion can be corrected through image processing on a captured image, and thus requires no optical correction.

In FIG. 2, FNO represents an F number, ω represents a half angle of view at each image height (unit: °), and d and g respectively represent aberrations on the d-line (λ=587.6 nm) and the g-line (λ=435.8 nm). In a spherical aberration graph, an astigmatism graph, and a coma aberration graph, a solid line and a broken line represent aberrations on a sagittal image surface, and a meridional image surface, respectively. The description above commonly applies to all the aberration graphs in each of Examples described below, and thus will not be redundantly described in the description on each Example below.

Example 2

Example 2 is described with reference to FIG. 3 and FIGS. 4A-4C and Table 2. FIG. 3 is a diagram illustrating a lens configuration of a zoom lens ZL (2) according to Example 2 of the present embodiment. This zoom lens ZL(2) includes, in order from an object: a first lens group G1 having negative refractive power; an aperture stop S that moves in the optical axis direction upon zooming; a second lens group G2 having positive refractive power; a third lens group G3 having negative refractive power; and a fourth lens group G4 having positive refractive power, as illustrated in the figure. A filter FL including a lowpass filter, an infrared cut filter, and the like, and an image surface I are provided on the image surface side of the fourth lens group G4.

The first to the third lens groups G1 to G3 and the aperture stop S each move in the axis direction upon zooming as indicated by an arrow in FIG. 3 The fourth lens group G4 does not move. Thus, surface distances D6, D7, D15, and D17 among these lens groups are variable, and values of these distances are described in Table [Variable distance data].

The first lens group G1 includes, in order from the object: a negative meniscus lens L11 having a convex surface (1st surface) facing the object; a negative lens L12 having a biconcave shape; and a positive meniscus lens L13 having a convex surface facing the object. A 2nd surface of the negative meniscus lens L11 on the image side and a 4th surface of the biconcave negative lens L12 on the image side are aspherical surfaces.

The second lens group G2 includes, in order from the object: a positive lens L21 having a biconvex shape; a positive lens L22 having a biconvex shape; a negative lens L23 having a biconcave shape; a negative meniscus lens L24 having a convex surface facing the object; and a positive lens L25 having a biconvex shape. The positive lens L22 and the negative lens L23 are integrally cemented to form a cemented lens. The negative meniscus lens L24 and the positive lens L25 are also integrally cemented to form a cemented lens. Both surfaces (8th and 9th surfaces) of the positive lens L21, and a 15th surface of the positive lens L25 on the image side are aspherical surfaces.

The third lens group G3 includes a negative meniscus lens L31 having a convex surface facing the object. A 17th surface of the negative meniscus lens L31 on the image side is an aspherical surface.

The fourth lens group G4 includes, in order from the object: a positive lens L41 having a biconvex shape; and a negative meniscus lens L42 having a convex surface facing the image, and the lenses L41 and L42 are integrally cemented to form a cemented lens.

An aperture stop S, for adjusting the amount of light, is provided between the first lens group G1 and the second lens group G2. The aperture stop S is moved in the optical axis direction, independently from the first to the fourth lens groups G1 to G4, upon zooming.

In the zoom lens ZL(2), the negative meniscus lens L31 in the third lens group G3 moves toward the image surface upon focusing from infinity (long distant object) to a short distant object.

In the zoom lenses ZL (2), at least a part of the second lens group G2 serves as a vibration-proof lens group, with a displacement component in a direction orthogonal to the optical axis, to be in charge of image blur correction on the image surface I (image stabilization, camera shake correction).

Table 2 below lists specification values of the optical system according to Example 2.

(Table 2)

[Lens data]

| Surface number | R | D | nd | vd |
|---|---|---|---|---|
| 1 | 90.635 | 1.904 | 1.6935 | 53.2 |
| 2* | 12.692 | 12.707 | | |
| 3 | −43.961 | 1.360 | 1.5891 | 61.2 |
| 4* | 94.705 | 0.204 | | |
| 5 | 36.364 | 3.400 | 2.0007 | 25.5 |
| 6 | 137.480 | (variable) | | |
| 7 | ∞ | (variable) | (stop S) | |
| 8* | 19.250 | 4.420 | 1.7433 | 49.3 |
| 9* | −87.249 | 2.324 | | |
| 10 | 42.229 | 2.924 | 1.5932 | 67.9 |
| 11 | −42.229 | 0.952 | 1.7380 | 32.3 |
| 12 | 16.308 | 3.907 | | |
| 13 | 28.541 | 0.952 | 1.7283 | 28.4 |
| 14 | 19.153 | 4.624 | 1.4971 | 81.5 |
| 15* | −24.109 | (variable) | | |
| 16 | 378.265 | 1.088 | 1.7433 | 49.3 |
| 17* | 32.168 | (variable) | | |
| 18 | 39.130 | 4.216 | 1.8348 | 42.7 |
| 19 | −74.718 | 1.224 | 1.6889 | 31.2 |
| 20 | −262.292 | 5.937 | | |
| 21 | ∞ | 2.123 | 1.5168 | 63.9 |
| 22 | ∞ | (BF) | | |

[Overall specifications]

| | Wide | Middle | Tele |
|---|---|---|---|
| f | 9.38 | 15.16 | 24.48 |
| Aperture stop diameter | 16.32 | 16.32 | 16.32 |
| Fno. | 1.86 | 2.34 | 2.90 |
| ω | 50.71 | 37.08 | 23.83 |
| BF | 2.50 | 2.50 | 2.50 |
| Air equivalent BF | 9.83 | 9.83 | 9.83 |
| TL | 106.17 | 92.43 | 89.59 |
| Air equivalent TL | 105.44 | 91.71 | 88.86 |

[Aspherical data]

| | K | A4 | A6 | A8 | A10 |
|---|---|---|---|---|---|
| 2nd surface | −1.488 | 1.078E−04 | −3.224E−07 | 1.130E−09 | −1.639E−12 |
| 4th surface | 1.000 | 1.127E−05 | 9.434E−09 | −3.189E−11 | 1.816E−13 |
| 8th surface | −0.946 | 2.454E−05 | 1.313E−08 | 0.000E+00 | 0.000E+00 |
| 9th surface | 1.000 | 1.850E−05 | −1.161E−08 | 0.000E+00 | 0.000E+00 |
| 15th surface | 1.000 | 1.532E−05 | 1.146E−07 | −3.308E−10 | 1.869E−12 |
| 17th surface | 1.000 | 1.514E−05 | −3.425E−08 | 0.000E+00 | 0.000E+00 |

[Variable distance data]

| | Wide | Middle | Tele |
|---|---|---|---|
| f | 9.38 | 15.16 | 24.48 |
| D6 | 33.328 | 17.273 | 3.918 |
| D7 | 6.395 | 1.496 | 1.496 |

-continued

[Variable distance data]

| | Wide | Middle | Tele |
|---|---|---|---|
| D15 | 2.448 | 6.207 | 12.351 |
| D17 | 7.233 | 10.691 | 15.061 |

[Lens group data]

| Group number | Group starting surface | Group focal length | Lens configuration length |
|---|---|---|---|
| G1 | 1 | −22.319 | 19.575 |
| G2 | 8 | 23.771 | 20.103 |
| G3 | 16 | −47.363 | 1.088 |
| G4 | 18 | 38.995 | 5.440 |

[Conditional expression corresponding value]

D1/D2=5.21                Conditional expression(1)

M2/Ms=1.38                Conditional expression(2)

TLw/TLt=1.19              Conditional expression(3)

−β2t=0.94                 Conditional expression(4)

β3w=1.55                  Conditional expression(5)

(Rn2+Rn1)/(Rn2−Rn1)=0.37  Conditional expression(6)

(R31+R32)/(R31−R32)=1.19  Conditional expression(7)

(R21+R12)/(R21−R12)=0.55  Conditional expression(8)

ωw=50.71°                 Conditional expression(9)

ωt=23.83°                 Conditional expression(10)

As can be seen in Table [Conditional expression corresponding value], the zoom lens ZL (2) according to Example 2 illustrated in FIG. 2 satisfies all of the conditional expressions (1) to (10).

Figure 4C:
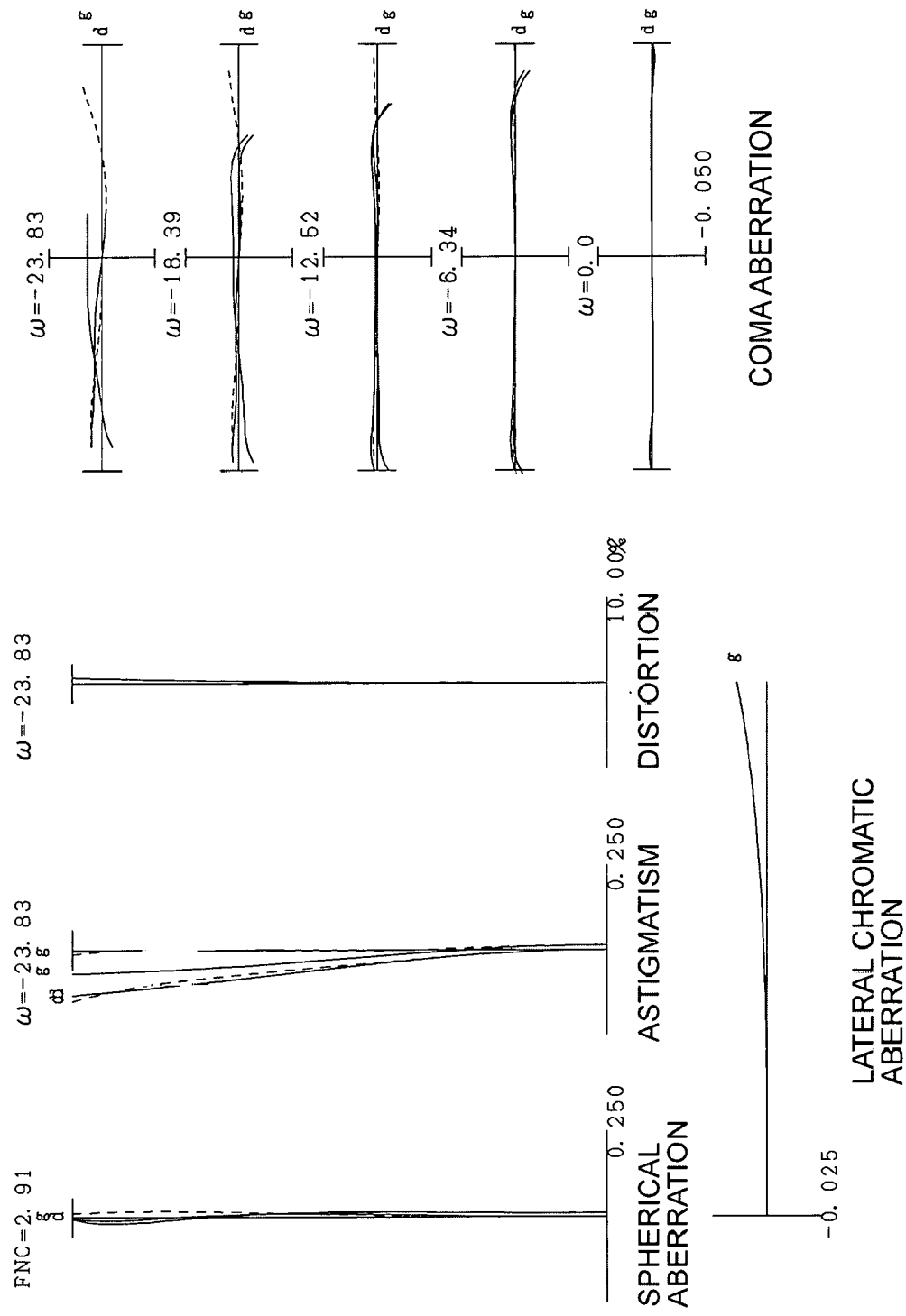

FIGS. 4A, 4B, and 4C are graphs showing various aberrations of the zoom lens ZL (2) according to Example 2 upon focusing on infinity, respectively in the wide angle end state, the intermediate focal length state, and the telephoto end state.

It can be seen in these aberration graphs that the zoom lens ZL (2) according to Example 2 can achieve excellent imaging performance with various aberrations successfully corrected from the wide angle end state to the telephoto end state.

Example 3

Example 3 is described with reference to FIG. 5 and FIGS. 6A-6C and Table 3. FIG. 5 is a diagram illustrating a lens configuration of a zoom lens ZL (3) according to Example 3 of the present embodiment. This zoom lens ZL(3) includes, in order from an object: a first lens group G1 having negative refractive power; an aperture stop S that moves in the optical axis direction upon zooming; a second lens group G2 having positive refractive power; a third lens group G3 having negative refractive power; and a fourth lens group G4 having positive refractive power, as illustrated in the figure. An image surface I is formed with a filter FL, including a lowpass filter, an infrared cut filter, and the like, provided on the image surface side of the fourth lens group G4.

The first to the fourth lens groups G1 to G4 and the aperture stop S each move in the axis direction upon zooming as indicated by arrows in FIG. 5. Thus, the surfaces distances D6, D7, D15, D17, and D19 among these lens groups are variable, and values of these distances are described in Table [Variable distance data].

The first lens group G1 includes, in order from the object: a negative meniscus lens L11 having a convex surface (1st surface) facing the object; a negative lens L12 having a biconcave shape; and a positive meniscus lens L13 having a convex surface facing the object. A 2nd surface of the negative meniscus lens L11 on the image side and a 4th surface of the biconcave negative lens L12 on the image side are aspherical surfaces.

The second lens group G2 includes, in order from the object: a positive lens L21 having a biconvex shape; a positive lens L22 having a biconvex shape; a negative lens L23 having a biconcave shape; a negative meniscus lens L24 having a convex surface facing the object; and a positive lens L25 having a biconvex shape. The positive lens L22 and the negative lens L23 are integrally cemented to form a cemented lens. The negative meniscus lens L24 and the positive lens L25 are also integrally cemented to form a cemented lens. Both surfaces (8th and 9th surfaces) of the positive lens L21, and a 15th surface of the positive lens L25 on the image side are aspherical surfaces.

The third lens group G3 includes a negative lens L31 having a biconcave shape. Both surfaces (16th and 17th surfaces) of the negative lens L31 are aspherical surfaces.

The fourth lens group G4 includes a positive lens L41 having a biconvex shape. An 18th surface of the positive lens L41 on the object side is an aspherical surface.

An aperture stop S, for adjusting the amount of light, is provided between the first lens group G1 and the second lens group G2. The aperture step S is moved in the optical axis direction, independently from the first to the fourth lens groups G1 to G4, upon zooming.

In the zoom lens ZL(3), the negative lens L31 in the third lens group G3 moves toward the image surface upon focusing from infinity (long distant object) to a short distant object.

In the zoom lenses ZL(3), at least a part of the second lens group G2 serves as a vibration-proof lens group, with a displacement component in a direction orthogonal to the optical axis, to be in charge of image blur correction on the image surface I (image stabilization, camera shake correction).

Table 3 below lists specification values of the optical system according to Example 3.

TABLE 3

[Lens data]

| Surface number | R | D | nd | vd |
|---|---|---|---|---|
| 1 | 89.239 | 1.880 | 1.6935 | 53.2 |
| 2* | 12.699 | 12.475 | | |
| 3 | −54.916 | 1.389 | 1.5891 | 61.1 |
| 4* | 59.140 | 0.358 | | |
| 5 | 32.753 | 3.400 | 2.0007 | 25.5 |
| 6 | 102.675 | (variable) | | |
| 7 | ∞ | (variable) | (stop S) | |
| 8* | 20.263 | 4.216 | 1.7433 | 49.3 |
| 9* | −176.689 | 2.733 | | |

TABLE 3-continued

[Lens data]

| Surface number | R | D | nd | vd |
|---|---|---|---|---|
| 10 | 29.309 | 3.264 | 1.5932 | 67.9 |
| 11 | −58.729 | 0.952 | 1.7380 | 32.3 |
| 12 | 15.058 | 3.672 | | |
| 13 | 25.588 | 0.952 | 1.7283 | 28.4 |
| 14 | 19.040 | 4.216 | 1.4971 | 81.5 |
| 15* | −24.342 | (variable) | | |
| 16* | −192.356 | 1.174 | 1.7433 | 49.3 |
| 17* | 45.297 | (variable) | | |
| 18* | 33.938 | 3.689 | 1.7738 | 47.2 |
| 19 | −310.680 | (variable) | | |
| 20 | ∞ | 2.888 | 1.5168 | 63.8 |
| 21 | ∞ | (BF) | | |

[Overall specifications]

| | Wide | Middle | Tele |
|---|---|---|---|
| f | 9.38 | 15.16 | 24.48 |
| Aperture stop diameter | 16.32 | 16.32 | 16.32 |
| Fno. | 1.86 | 2.38 | 2.94 |
| ω | 50.38 | 37.06 | 23.74 |
| BF | 1.99 | 1.99 | 1.99 |
| Air equivalent BF | 10.72 | 10.72 | 11.02 |
| TL | 106.42 | 92.96 | 90.98 |
| Air equivalent TL | 105.43 | 91.97 | 89.99 |

[Aspherical data]

| | K | A4 | A6 | A8 | A10 |
|---|---|---|---|---|---|
| 2nd surface | 0.071 | 1.658E−05 | 2.222E−08 | 3.902E−11 | −4.443E−14 |
| 4th surface | 1.000 | 1.081E−05 | 6.893E−09 | 3.858E−11 | −2.974E−14 |
| 8th surface | 0.805 | −4.971E−06 | 1.821E−08 | 0.000E+00 | 0.000E+00 |
| 9th surface | 1.000 | 1.321E−05 | 9.530E−09 | 0.000E+00 | 0.000E+00 |
| 15th surface | 1.000 | 1.190E−05 | 5.550E−08 | −4.859E−10 | 2.837E−12 |
| 16th surface | 1.000 | 9.045E−06 | 2.238E−07 | 0.000E+00 | 0.000E+00 |
| 17th surface | 1.000 | 1.927E−05 | 2.308E−07 | −5.111E−10 | 4.618E−12 |
| 18th surface | 1.000 | −4.452E−06 | 1.587E−09 | 0.000E+00 | 0.000E+00 |

[Variable distance data]

| | Wide | Middle | Tele |
|---|---|---|---|
| f | 9.38 | 15.16 | 24.48 |
| D6 | 33.010 | 18.064 | 4.518 |
| D7 | 6.657 | 0.798 | 1.217 |
| D15 | 2.696 | 6.570 | 12.337 |
| D17 | 7.976 | 11.448 | 16.533 |
| D19 | 6.827 | 6.827 | 7.124 |

[Lens group data]

| Group number | Group starting surface | Group focal length | Lens configuration length |
|---|---|---|---|
| G1 | 1 | −21.991 | 19.501 |
| G2 | 8 | 23.891 | 20.005 |
| G3 | 16 | −49.221 | 1.174 |
| G4 | 18 | 39.726 | 3.689 |

[Conditional expression corresponding value]

D1/D2=4.96    Conditional expression(1)

M2/Ms=1.42    Conditional expression(2)

TLw/TLt=1.17    Conditional expression(3)

−β2t=0.95    Conditional expression(4)

β3w=1.54    Conditional expression(5)

(Rn2+Rn1)/(Rn2−Rn1)=0.04    Conditional expression(6)

(R31+R32)/(R31−R32)=0.62    Conditional expression(7)

(R21+R12)/(R21−R12)=0.62    Conditional expression(8)

ωw−50.38°    Conditional expression(9)

ωt=23.74°    Conditional expression(10)

As can be seen in Table [Conditional expression corresponding value], the zoom lens ZL (3) according to Example 3 illustrated in FIG. 5 satisfies all of the conditional expressions (1) to (10).

FIGS. 6A, 6B, and 6C are graphs showing various aberrations of the zoom lens ZL (3) according to Example 3 upon focusing on infinity, respectively in the wide angle end state, the intermediate focal length state, and the telephoto end state.

It can be seen in these aberration graphs that the zoom lens ZL (3) according to Example 3 can achieve excellent imaging performance with various aberrations successfully corrected from the wide angle end state to the telephoto end state.

Example 4

Example 4 is described with reference to FIG. 7 and FIGS. 8A-8C and Table 4. FIG. 7 is a diagram illustrating a lens configuration of a zoom lens ZL (4) according to Example 4 of the present embodiment. This zoom lens ZL(4) includes, in order from an object: a first lens group G1 having negative refractive power; an aperture stop S that moves in the optical axis direction upon zooming; a second lens group G2 having positive refractive power; a third lens group G3 having negative refractive power; a fourth lens group G4 having positive refractive power; and a fifth lens group G5 having negative refractive power, as illustrated in the figure. An image surface I is formed with a filter FL, including a lowpass filter, an infrared cut filter, and the like, provided on the image surface side of the fifth lens group G5.

The first to the fourth lens groups G1 to G4 and the aperture stop S each move in the axis direction upon zooming as indicated by arrows in FIG. 7. The fifth lens group G5 does not move in the axis direction. Thus, the surfaces distances D6, D7, D15, D17, and D19 among these lens groups are variable, and values of these distances are described in Table [Variable distance data].

The first lens group G1 includes, in order from the object: a negative meniscus lens L11 having a convex surface (1st surface) facing the object; a negative lens L12 having a biconcave shape; and a positive meniscus lens L13 having a convex surface facing the object. A 2nd surface of the negative meniscus lens L11 on the image side and a 4th surface of the biconcave negative lens L12 on the image side are aspherical surfaces.

The second lens group G2 includes, in order from the object: a positive lens L21 having a biconvex shape; a positive meniscus lens L22 having a convex surface facing the object; a negative meniscus lens L23 having a convex surface facing the object; a negative meniscus lens L24 having a convex surface facing the object; and a positive lens L25 having a biconvex shape. The positive meniscus lens L22 and the negative meniscus lens L23 are integrally cemented to form a cemented lens. The negative meniscus lens L24 and the positive lens L25 are also integrally cemented to form a cemented lens. Both surfaces (8th and 9th surfaces) of the positive lens L21, and a 15th surface of the positive lens L25 on the image side are aspherical surfaces.

The third lens group G3 includes a negative lens L31 having a biconcave shape. Both surfaces (16th and 17th surfaces) of the negative lens L31 are aspherical surfaces.

The fourth lens group G4 includes a positive lens L41 having a biconvex shape. An 18th surface of the positive lens L41 on the object side is an aspherical surface.

The fifth lens group G5 includes a negative meniscus lens L51 having a convex surface facing the image side.

An aperture stop S, for adjusting the amount of light, is provided between the first lens group G1 and the second lens group G2. The aperture stop S is moved in the optical axis direction, independently from the first to the fifth lens groups G1 to G5, upon zooming.

In the zoom lens ZL(4), the negative lens L31 in the third lens group G3 moves toward the image surface upon focusing from infinity (long distant object) to a short distant object.

In the zoom lenses ZL (4), at least a part of the second lens group G2 serves as a vibration-proof lens group, with a displacement component in a direction orthogonal to the optical axis, to be in charge of image blur correction on the image surface I (image stabilization, camera shake correction).

Table 4 below lists specification values of the optical system according to Example 4.

TABLE 4

[Lens data]

| Surface number | R | D | nd | vd |
|---|---|---|---|---|
| 1 | 91.250 | 1.932 | 1.6935 | 53.2 |
| 2* | 13.230 | 12.658 | | |
| 3 | −50.417 | 1.380 | 1.5891 | 61.1 |
| 4* | 71.694 | 0.483 | | |
| 5 | 36.339 | 3.450 | 2.0007 | 25.5 |
| 6 | 118.316 | (variable) | | |
| 7 | ∞ | (variable) | (stop S) | |
| 8* | 19.982 | 4.278 | 1.7433 | 49.3 |
| 9* | 304.357 | 2.484 | | |
| 10 | 24.138 | 3.312 | 1.5932 | 67.9 |
| 11 | 301.893 | 0.690 | 1.7380 | 32.3 |
| 12 | 14.520 | 3.450 | | |

TABLE 4-continued

[Lens data]

| Surface number | R | D | nd | vd |
|---|---|---|---|---|
| 13 | 21.813 | 1.242 | 1.7283 | 28.4 |
| 14 | 15.913 | 4.830 | 1.4971 | 81.5 |
| 15* | −28.043 | (variable) | | |
| 16* | −439.009 | 1.104 | 1.7433 | 49.3 |
| 17* | 41.310 | (variable) | | |
| 18* | 39.581 | 4.416 | 1.6226 | 58.2 |
| 19 | −68.087 | (variable) | | |
| 20 | −175.4305 | 1.811 | 1.7725 | 49.6 |
| 21 | −498.7061 | 0.84622 | | |
| 22 | ∞ | 1.550 | 1.5168 | 63.8 |
| 23 | ∞ | (BF) | | |

[Overall specifications]

| | Wide | Middle | Tele |
|---|---|---|---|
| f | 9.52 | 15.38 | 24.84 |
| Aperture stop diameter | 16.56 | 16.56 | 16.56 |
| Fno. | 1.86 | 2.37 | 2.93 |
| ω | 49.79 | 36.67 | 23.51 |
| BF | 2.20 | 2.20 | 2.20 |
| Air equivalent BF | 4.07 | 4.07 | 4.07 |
| TL | 108.74 | 95.09 | 93.10 |
| Air equivalent TL | 108.21 | 94.56 | 92.57 |

[Aspherical data]

| | K | A4 | A6 | A8 | A10 |
|---|---|---|---|---|---|
| 2nd surface | −1.051 | 7.417E−05 | −1.332E−07 | 4.210E−10 | −6.374E−13 |
| 4th surface | 1.000 | 9.044E−06 | 4.587E−09 | 2.992E−11 | 1.515E−14 |
| 8th surface | 0.687 | −4.417E−07 | 1.966E−08 | 0.000E+00 | 0.000E+00 |
| 9th surface | 1.000 | 1.278E−05 | 8.994E−09 | 0.000E+00 | 0.000E+00 |
| 15th surface | 1.000 | 1.187E−05 | 5.679E−08 | −9.484E−10 | 5.882E−12 |
| 16th surface | 1.000 | 3.405E−05 | 3.755E−08 | 0.000E+00 | 0.000E+00 |
| 17th surface | 1.000 | 5.050E−05 | 3.429E−08 | 3.867E−10 | −2.196E−12 |
| 18th surface | 1.000 | −5.487E−06 | 1.209E−08 | 0.000E+00 | 0.000E+00 |

[Variable distance data]

| | Wide | Middle | Tele |
|---|---|---|---|
| f | 9.52 | 15.38 | 24.84 |
| D6 | 33.620 | 18.450 | 4.711 |
| D7 | 6.919 | 0.973 | 1.391 |
| D15 | 3.249 | 7.179 | 13.024 |
| D17 | 6.304 | 9.826 | 14.981 |
| D19 | 6.527 | 6.537 | 6.870 |

[Lens group data]

| Group number | Group starting surface | Group focal length | Lens configuration length |
|---|---|---|---|
| G1 | 1 | −22.322 | 19.903 |
| G2 | 8 | 24.282 | 20.286 |
| G3 | 16 | −50.747 | 1.104 |
| G4 | 18 | 40.843 | 4.416 |
| G5 | 20 | −351.18817 | 4.2073 |

[Conditional expression corresponding value]

| | |
|---|---|
| D1/D2=4.86 | Conditional expression(1) |
| M2/Ms=1.42 | Conditional expression(2) |
| TLw/TLt=1.17 | Conditional expression(3) |
| $-\beta 2t$=0.96 | Conditional expression(4) |
| $\beta 3w$=1.53 | Conditional expression(5) |
| (Rn2+Rn1)/(Rn2−Rn1)=0.17 | Conditional expression(6) |
| (R31+R32)/(R31−R32)=0.83 | Conditional expression(7) |
| (R21+R12)/(R21−R12)=0.58 | Conditional expression(8) |
| ωw=49.79° | Conditional expression(9) |
| ωt=23,51° | Conditional expression(10) |

As can be seen in Table [Conditional expression corresponding value], the zoom lens ZL (4) according to Example 4 illustrated in FIG. 7 satisfies all of the conditional expressions (1) to (10).

Figure 8A:
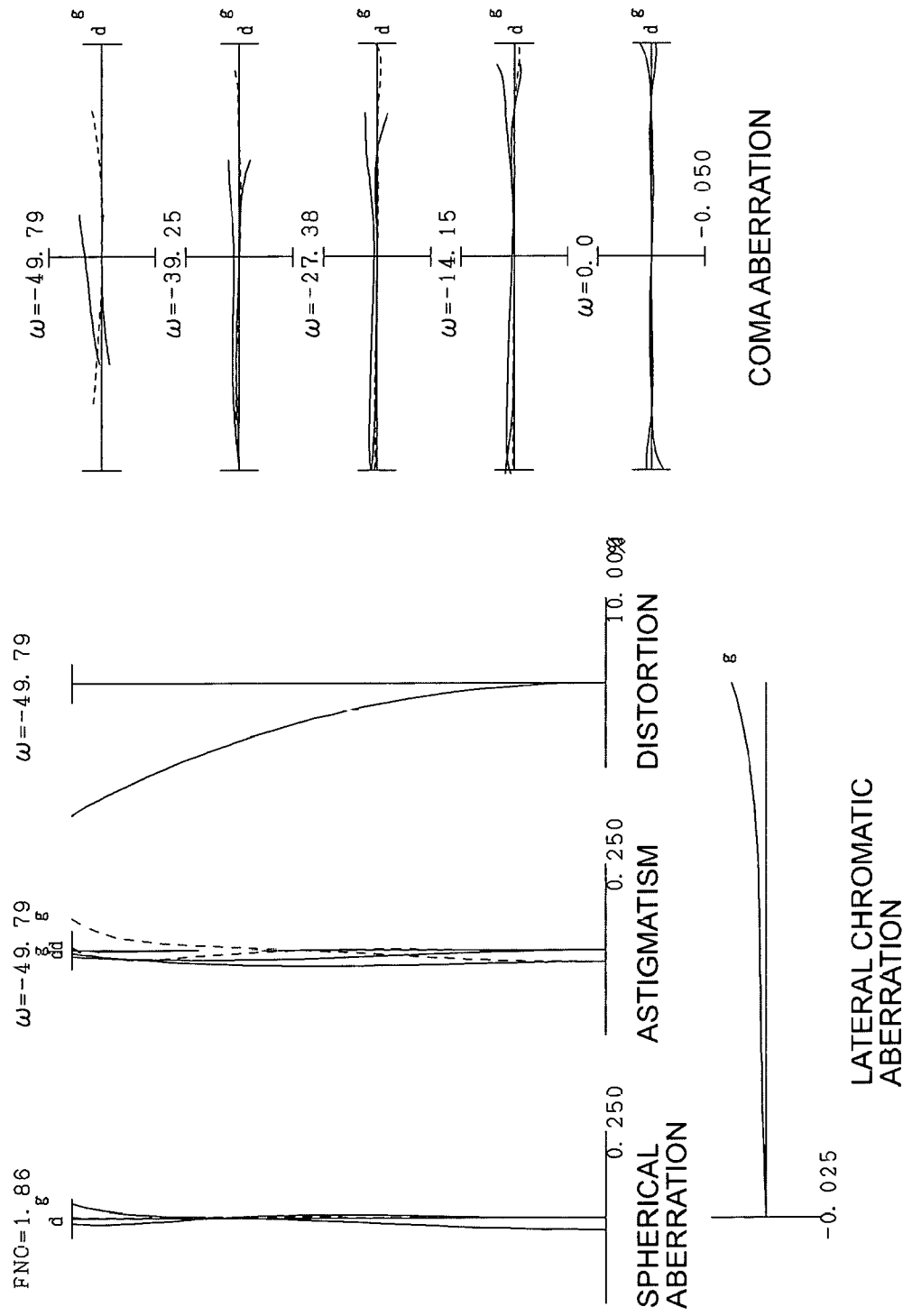
Figure 8B:
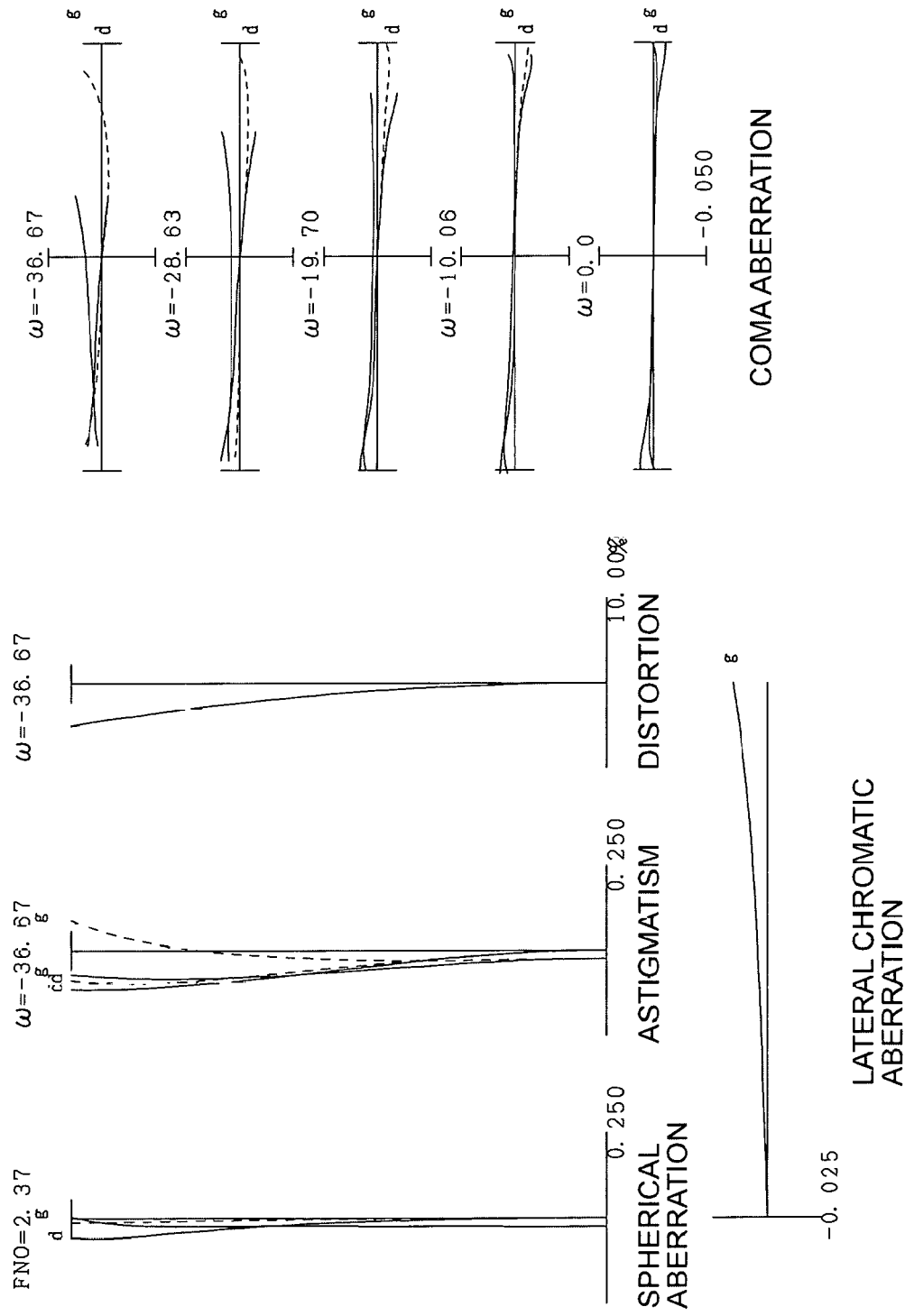

FIGS. 8A, 8B, and 8C are graphs showing various aberrations of the zoom lens ZL (4) according to Example 4 upon focusing on infinity, respectively in the wide angle end state, the intermediate focal length state, and the telephoto end state.

It can be seen in these aberration graphs that the zoom lens ZL (4) according to Example 4 can achieve excellent imaging performance with various aberrations successfully corrected from the wide angle end state to the telephoto end state.

Examples described above are merely examples of the invention according to the present application. The invention according to the present application is not limited to these examples.

The following configurations can be appropriately employed as long as the optical performance of the zoom lens according to the present embodiment is not compromised.

The zoom lens according to Examples of the present embodiment has the four and the five lens groups. However, this should not be construed in a limiting sense, and a zoom lens with other lens group configurations (for example, a configuration with six lens groups or the like) may be employed. More specifically, the zoom lens according to the present embodiment may be further provided with a lens or a lens group closest to an object or further provided with a lens or a lens group closest to the image surface. The lens group is a portion including at least one lens separated from another lens with a distance varying upon zooming.

A focusing lens group may be provided for focusing from an infinite distant object to a short distant object, with a single or a plurality of lens groups or a partial lens group moved in the optical axis direction. The focusing lens group can be applied to auto focus, and is suitable for motor driving for auto focus (using supersonic wave motors, etc.). At least a part of the third lens group is especially preferably used as the focusing lens group. At least a part of the fourth lens group is especially preferably used as the focusing lens group.

The lens groups may be entirely or partially moved with a component in a direction orthogonal to the optical axis, or may be moved and rotated (swing) within an in-plane direction including the optical axis, to serve as a vibration-proof lens group for correcting image blur due to camera shake or the like. At least a part of the second lens group is especially preferably used as the vibration-proof lens group.

The lens surface may be formed to have a spherical surface or a planer surface, or may be formed to have an aspherical shape. The lens surface having a spherical surface or a planer surface features easy lens processing and assembly adjustment, which leads to the processing and assembly adjustment less likely to involve an error compromising the optical performance, and thus is preferable. Furthermore, there is an advantage that a rendering performance is not largely compromised even when the image surface is displaced.

The lens surface having an aspherical shape may be achieved with any one of an aspherical shape formed by grinding, a glass-molded aspherical shape obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

The aperture stop is preferably disposed in the neighborhood of or within the second group. Alternatively, a lens frame may serve as the aperture stop so that the member serving as the aperture stop needs not to be provided.

The lens surfaces may be provided with an antireflection film featuring high transmittance over a wide range of wavelengths to achieve an excellent optical performance with reduced flare and ghosting and increased contrast.

The zoom lens (zoom optical system) according to the present embodiment has a zooming rate in a range of approximately 1.5 to 7.

| EXPLANATION OF NUMERALS AND CHARACTERS | |
|---|---|
| G1 | first lens group |
| G2 | second lens group |
| G3 | third lens group |
| G4 | fourth lens group |
| G5 | fifth lens group |
| FL | filter |
| I | image surface |
| S | aperture stop |

The invention claimed is:

1. A zoom lens comprising, in order from an object: a first lens group having negative refractive power; a second lens group having positive refractive power; a third lens group having negative refractive power; and a fourth lens group having positive refractive power, wherein
an aperture stop is provided between the first to the fourth lens groups,
upon zooming from a wide angle end state to a telephoto end state, the aperture stop is moved in an optical axis direction independently of the first to the fourth lens groups, and a distance between the aperture stop and one of the lens groups placed next to the aperture stop on an object side and a distance between the aperture stop and another one of the lens groups next to the aperture stop on an image side are changed,
at least a part of the third lens group serves as a focusing lens, and
a following conditional expression is satisfied $$1.1 < TLw/TLt < 1.30$$

where,
TLw denotes total length of the zoom lens in the wide angle end state, and
TLt denotes a total length of the zoom lens in the telephoto end state.

2. The zoom lens according to claim 1, wherein a following conditional expression is satisfied $$3.00 < D1/D2 < 7.00$$

where,
D1 denotes the distance between the first lens group and the aperture stop in the wide angle end state, and
D2 denotes the distance between the aperture stop and the second lens group in the wide angle end state.

3. The zoom lens according to claim 1, wherein a following conditional expression is satisfied $$1.20 < M2/Ms < 1.60$$

where,
Ms denotes a movement amount of the aperture stop upon zooming from the wide angle end state to the telephoto end state, and
M2 denotes a movement amount of the second lens group upon zooming from the wide angle end state to the telephoto end state.

4. The zoom lens according to claim 1, wherein a following conditional expression is satisfied $$0.80 < -\beta 2t < 1.10$$

where,
$\beta 2t$ denotes a magnification of the second lens group in the telephoto end state.

5. The zoom lens according to claim 1, wherein a following conditional expression is satisfied $$1.30 < \beta 3w < 1.90$$

where,
$\beta 3w$ denotes a magnification of the third lens group in the wide angle end state.

6. The zoom lens according to claim 1, wherein the first lens group comprises, in order from the object, a first object closest lens and an adjacent second object closest negative lens, and
a following conditional expression is satisfied $$-0.30 < (Rn2+Rn1)/(Rn2-Rn1) < 1.00$$

where,
Rn1 denotes a radius of curvature of an object-side surface of the adjacent second object closest negative lens, and
Rn2 denotes a radius of curvature of an image-side surface of the adjacent second object closest negative lens.

7. The zoom lens according to claim 1, wherein a following conditional expression is satisfied $$0.40 < (R31+R32)/(R31-R32) < 2.50$$

where,
R31 denotes a radius of curvature of surface closest to the object of the third lens group, and
R32 denotes a radius of curvature of surface closest to the image of the third lens group.

8. The zoom lens according to claim 1, wherein a following conditional expression is satisfied $$0.20<(R21+R12)/(R21-R12)<0.90$$

where,
R12 denotes a radius of curvature of an image-side surface of a lens closest to the object in the first lens group, and
R21 denotes a radius of curvature of an object-side surface of a lens second closest to the object in the first lens group.

9. The zoom lens according to claim 1, wherein a following conditional expression is satisfied $$39.00°<\omega w<70.00°$$

where,
$\omega w$ denotes a half angle of view in the wide angle end state.

10. The zoom lens according to claim 1, wherein a following conditional expression is satisfied $$15.00°<\omega t<34.00°$$

where,
$\omega t$ denotes a half angle of view in the telephoto end state.

11. The zoom lens according to claim 1, wherein the first lens group, the second lens group, and the third lens group move in the optical axis direction upon zooming from the wide angle end state to the telephoto end state.

12. The zoom lens according to claim 1, wherein upon zooming from a wide angle end state to a telephoto end state, the first lens group monotonically moves toward the image side.

13. The zoom lens according to claim 1, wherein at least a part of the second lens group is configured to serve as a vibration-proof lens group with a displacement component in a direction orthogonal to the optical axis.

14. An optical apparatus comprising a lens barrel and the zoom lens according to claim 1 installed in the lens barrel.

15. A method for manufacturing a zoom lens including, in order from an object: a first lens group having negative refractive power; a second lens group having positive refractive power; a third lens group having negative refractive power; and a fourth lens group having positive refractive power, the method comprising:
  arranging the first to the fourth lens groups within a lens barrel in such a manner that,
  an aperture stop is provided between the first to the fourth lens groups,
  upon zooming from a wide angle and state to a telephoto end state, the aperture stop is moved in an optical axis direction independently of the first to the fourth lens groups, and a distance between the aperture stop and one of the lens groups placed next to the aperture stop and another one of the lens groups next to the aperture stop on an image are changed,
  at least a part of the third lens group serves as a focusing lens, and
  a following conditional expression is satisfied $$1.10<TLw/TLt<1.30$$

where,
TLw denotes a total length of the zoom lens in the wide angle end state and
TLt denotes a total length of the zoom lens in the telephoto end state.

* * * * *